(12) United States Patent
Zhou et al.

(10) Patent No.: US 12,481,114 B2
(45) Date of Patent: Nov. 25, 2025

(54) CAMERA MODULE AND OPTICAL LENS THEREOF, OPTICAL LENS SHEET AND FABRICATION METHOD THEREFOR, AND METHOD FOR ASSEMBLING LARGE WIDE-ANGLE CAMERA MODULE

(71) Applicant: NINGBO SUNNY OPOTECH CO., LTD., Yuyao (CN)

(72) Inventors: Kailun Zhou, Yuyao (CN); Bing Wu, Yuyao (CN); Meishan Guo, Yuyao (CN); Wei Li, Yuyao (CN); Wenbin Li, Yuyao (CN); Yu Huang, Yuyao (CN); Yan Jin, Yuyao (CN)

(73) Assignee: NINGBO SUNNY OPOTECH CO., LTD., Yuyao (CN)

(*) Notice: Subject to any disclaimer, the term of this patent is extended or adjusted under 35 U.S.C. 154(b) by 827 days.

(21) Appl. No.: 17/772,636

(22) PCT Filed: Aug. 28, 2020

(86) PCT No.: PCT/CN2020/112263
§ 371 (c)(1),
(2) Date: Apr. 28, 2022

(87) PCT Pub. No.: WO2021/082705
PCT Pub. Date: May 6, 2021

(65) Prior Publication Data
US 2022/0413250 A1 Dec. 29, 2022

(30) Foreign Application Priority Data

Oct. 29, 2019 (CN) .......................... 201911037376.9
Oct. 29, 2019 (CN) .......................... 201911037398.5
Oct. 29, 2019 (CN) .......................... 201911038254.1

(51) Int. Cl.
*G02B 7/02* (2021.01)
*G03B 17/12* (2021.01)

(52) U.S. Cl.
CPC ............. *G02B 7/021* (2013.01); *G02B 7/023* (2013.01); *G03B 17/12* (2013.01)

(58) Field of Classification Search
CPC ......... G02B 7/021; G02B 7/023; G03B 17/12
(Continued)

(56) References Cited

U.S. PATENT DOCUMENTS 5,249,082 A * 9/1993 Newman ................ G02B 7/028
359/813
6,390,693 B1 * 5/2002 Miyamoto ............. G03B 17/14
396/529

(Continued)

FOREIGN PATENT DOCUMENTS

CN       1232979 A     10/1999
CN       1405581 A     3/2003
(Continued)

OTHER PUBLICATIONS

Extended European Search Report for European Application No. 20883455.6, dated Nov. 4, 2022.
(Continued)

*Primary Examiner* — Bumsuk Won
*Assistant Examiner* — Mitchell T Oestreich
(74) *Attorney, Agent, or Firm* — Birch, Stewart, Kolasch & Birch, LLP

(57) ABSTRACT

The present disclosure provides a camera module and an optical lens thereof, an optical lens element and a manufacturing method therefor, and a method for assembling a large wide-angle camera module, wherein the camera module comprises a lens and a photosensitive assembly. The lens comprises a lens barrel, at least one first lens element unit
(Continued)

and at least one second lens element unit, and is further provided with at least one notch, wherein the first lens element unit and the second lens element unit are disposed in the lens barrel, and the first lens element unit is configured as a non-rotating body, and wherein the notch is provided in the lens barrel, or the notch is formed in the first lens element unit, or the notch is formed in the second lens element unit, and the first lens element unit is marked by means of the notch.

19 Claims, 24 Drawing Sheets

(58) Field of Classification Search
USPC .......................................................... 359/819
See application file for complete search history.

(56) References Cited

U.S. PATENT DOCUMENTS

| | | | |
|---|---|---|---|
| 2012/0290972 | A1 | 11/2012 | Yook et al. |
| 2015/0089789 | A1 | 4/2015 | Nagayama et al. |
| 2017/0064164 | A1 | 3/2017 | Nishihara |

FOREIGN PATENT DOCUMENTS

| | | | |
|---|---|---|---|
| CN | 101174013 | A | 5/2008 |
| CN | 101431087 | A | 5/2009 |
| CN | 102171599 | A | 8/2011 |
| CN | 102576140 | A | 7/2012 |
| CN | 202886718 | U | 4/2013 |
| CN | 203615247 | U | 5/2014 |
| CN | 104534405 | A | 4/2015 |
| CN | 106125167 | A | 11/2016 |
| CN | 107388191 | A | 11/2017 |
| CN | 207336902 | U | 5/2018 |
| CN | 207965301 | U | 10/2018 |
| CN | 208384208 | U | 1/2019 |
| CN | 208506341 | U | 2/2019 |
| CN | 208572216 | U | 3/2019 |
| CN | 208818903 | U | 5/2019 |
| CN | 110320625 | A | 10/2019 |
| EP | 1 696 254 | A1 | 8/2006 |
| JP | 2004-205697 | A | 7/2004 |
| JP | 2008-33065 | A | 2/2008 |
| KR | 10-2009-0127649 | A | 12/2009 |
| TW | 201348751 | A | 12/2013 |
| WO | WO 2007/088190 | A1 | 8/2007 |
| WO | WO 2019/169823 | A1 | 9/2019 |

OTHER PUBLICATIONS

International Search Report, issued in PCT/CN2020/112263, dated Nov. 27, 2020.

European Communication pursuant to Article 94(3) EPC for European Application No. 20 883 455.6, dated May 15, 2025.

* cited by examiner (a) Photograph a clamped lens assembly 8100, identify at least one identification element 814 of a lens 810 of the lens assembly 8100 based on a visual identification system, and determine a direction of an effective diameter portion 8121 of a free-form optical lens element 812 of the lens 810 according to the identified identification element 814

(b) Electrically conduct a photosensitive assembly 8200, and obtain image information photographed by the photosensitive assembly 8200

(c) Adjust a position of the lens assembly 8100 relative to the photosensitive assembly 8200 based on the photographed image information, so that a target plane 8101 formed by the lens 810 covers a photosensitive imaging region 8221 of the photosensitive assembly 8200, and a clear image is formed by the photosensitive assembly 8200

(d) Fix the lens assembly 8100 and the photosensitive assembly 8200

FIG. 17

CAMERA MODULE AND OPTICAL LENS THEREOF, OPTICAL LENS SHEET AND FABRICATION METHOD THEREFOR, AND METHOD FOR ASSEMBLING LARGE WIDE-ANGLE CAMERA MODULE

CROSS REFERENCE TO RELATED APPLICATIONS

This application is the National Phase of PCT International Application No. PCT/CN2020/112263, filed on Aug. 28, 2020, which claims priority under 35 U.S.C. 119 (a) to patents application Ser. Nos. 20/191,1038254.1, 201911037398.5 and 201911037376.9, filed in China on Oct. 29, 2019, all of which are hereby expressly incorporated by reference into the present application.

TECHNICAL FIELD

The present disclosure relates to a camera module, and in particular to a camera module and an optical lens thereof, an optical lens element and a manufacturing method therefor, and a method for assembling a large wide-angle camera module.

BACKGROUND

With the popularization of mobile electronic devices, camera devices have become an indispensable part of electronic terminal equipment to meet users' needs for photographing images. An array camera module usually includes at least two camera modules, and the combination of camera modules with different functions is carried out according to different photographing requirements, so as to achieve better performance than single-optical lens photography in zoom photographing, large field of view photographing, etc., becoming a popular application now and in the future.

At present, an array camera module usually includes a telephoto camera module, a wide-angle camera module, a common module and so on. For example, a usual dual-camera module is composed of a telephoto module and a wide-angle module. A single electronic terminal is equipped with an array camera module. The increase in the number of camera modules and the addition of new function camera modules have put forward higher requirements for the production process, production efficiency and assembly requirements of camera modules.

Due to the large field of view of the camera module, the curvature of field and distortion caused by the large inclination of the light are large. For example, an optical lens with a field of view of 130° has a distortion greater than 10%. When using the existing checkerboard target to take pictures and test, the large distortion of the wide-angle camera module when testing the resolution makes it difficult to test the four-corner resolution of the conventional CTF target, that is, the image photographed by the wide-angle camera module is affected by distortion and the peripheral test line is severely bent. When using the existing edge processing algorithm for calculation, the error is large, and the overall resolution capability of the wide-angle camera module is poor. Usually, software is used for distortion correction. On the one hand, as the field of view of the wide-angle camera module becomes larger and larger, and the distortion range that can be adjusted by the software is limited, it is difficult to meet the distortion correction caused by the field of view exceeding 110°. On the other hand, software distortion correction will have the problem of losing pixels in the adjustment region. The amount of image data that needs to be processed by software correction is very large, and the requirements for necessary hardware are also very high.

In order to solve the distortion problem of the wide-angle camera module, starting from the improvement of the optical system itself, a free-form optical lens element is used to replace at least one common optical lens element in the optical lens, and the design freedom of the free-form surface is used to configure the optical path of the optical system, which reduces the distortion effect caused by the large wide angle so as to improve the technical parameters of the optical system. Since the free-form optical lens element is a non-rotationally symmetrical body, there is great uncertainty when the free-form optical lens element is mounted, especially during the assembly process of the camera module, it is necessary to make the effective imaging region formed by the free-form optical lens element correspond to the imaging region of the photosensitive chip. When an optical lens with a free-form optical lens element is assembled, it is difficult to observe the direction of the effective imaging region of the free-form surface, which brings difficulty to the assembly. During a further assembling process of the optical lens assembly of the camera module, due to the existence of the free-form optical lens element, it not only needs to move (shift) and tilt as to a plane direction, but also needs to correspond to the imaging region of the photosensitive chip according to the effective imaging region. Thus, it needs to be adjusted by means of rotating. The assembly speed of the optical lens with the free-form optical lens element in the prior art is limited by the position adjustment of the free-form optical lens element, and it is difficult to improve the assembly speed.

On the other hand, for a camera module capable of auto-focusing, i.e., a camera module with a motor, during the assembling process of the existing common camera module, the motor is first locked with the optical lens at a fixed height, and during the process of active focusing (active alignment process), equipment clamps the motor and the optical lens as a whole, and adjusts it with respect to the photosensitive assembly. However, when the optical lens provided with the free-form optical lens element is still assembled in the above-mentioned manner, after the rotation adjustment, the motor housing and the circuit board are easily misaligned, resulting in poor appearance of the camera module.

SUMMARY

One of the main advantages of the present disclosure is to provide a camera module and an optical lens thereof, an optical lens element and a manufacturing method, and a method for assembling a large wide-angle camera module, wherein the optical lens is an optical lens with a marking to identify the position of an imaging plane formed by the optical lens, which is advantageous to simplify the assembly of the camera module.

Another advantage of the present disclosure is to provide a camera module and an optical lens thereof, an optical lens element and a manufacturing method, and a method for assembling a large wide-angle camera module, wherein the optical lens comprises at least one first lens element unit, and an effective diameter of the first lens element unit is identified by means of making identification, so as to assemble the optical lens based on the effective diameter of the first lens element unit.

Another advantage of the present disclosure is to provide a camera module and an optical lens thereof, an optical lens element and a manufacturing method, and a method for assembling a large wide-angle camera module, wherein the optical lens is provided with a notch, and wherein the notch is provided in a lens barrel of the optical lens, and the effective diameter of the first lens element unit in the optical lens is identified by the position of the notch, so as to assemble the optical lens based on the effective diameter.

Another advantage of the present disclosure is to provide a camera module and an optical lens thereof, an optical lens element and a manufacturing method, and a method for assembling a large wide-angle camera module, wherein a notch is formed in such a manner that a cut edge is provided in the optical lens, so that the position of the imaging plane of the optical lens is identified according to the position of the mark.

Another advantage of the present disclosure is to provide a camera module and an optical lens thereof, an optical lens element and a manufacturing method, and a method for assembling a large wide-angle camera module, wherein the optical lens identifies the effective diameter, which is advantageous to simplify the assembly process steps of the camera module, realize the rapid assembly of the camera module with the first lens element unit, and improve the production and processing efficiency of the camera module.

Another advantage of the present disclosure is to provide a camera module and an optical lens thereof, an optical lens element and a manufacturing method, and a method for assembling a large wide-angle camera module, wherein a motor of the camera module is assembled directionally by means of the notch so that the optical lens is adapted to the directional alignment of the motor, and the appearance of the module meets the relevant requirements.

Another advantage of the present disclosure is to provide a camera module and an optical lens thereof, an optical lens element and a manufacturing method, and a method for assembling a large wide-angle camera module, wherein the optical lens simplifies the process of correcting the optical system of the camera module, the adjustment of the optical system itself and the design of reducing distortion are used to reduce the calculation amount and image loss in the image correction process of the camera module.

Another advantage of the present disclosure is to provide a camera module and an optical lens thereof, an optical lens element and a manufacturing method, and a method for assembling a large wide-angle camera module, wherein the notch of the optical lens is provided on the lens barrel, which facilitates visual recognition equipment to identify the optical lens according to the position of the notch, and facilitates the automation and intelligence of the assembly process.

Another advantage of the present disclosure is to provide a camera module and an optical lens thereof, an optical lens element and a manufacturing method, and a method for assembling a large wide-angle camera module, wherein the notch is formed on the optical lens surface of the optical lens by setting a hole at a specific position, which simplifies the processing and manufacturing procedure of the optical lens.

Another advantage of the present disclosure is to provide a camera module and an optical lens thereof, an optical lens element and a manufacturing method, and a method for assembling a large wide-angle camera module, wherein the assembly method is to visually identify the marking of the large wide-angle camera module, and to assemble a lens assembly and a photosensitive assembly of the large wide-angle camera module according to the position of the mark, which is advantageous to improve the yield of the large wide-angle camera module.

Another advantage of the present disclosure is to provide a camera module and an optical lens thereof, an optical lens element and a manufacturing method, and a method for assembling a large wide-angle camera module, wherein the position of the mark is visually identified, and the position of a target surface formed by the lens assembly is calculated according to the marked position, so as to facilitate identification during the assembly process, so that the target surface of the optical system corresponds to the photosensitive region of the photosensitive element, improving the product yield.

Another advantage of the present disclosure is to provide a camera module and an optical lens thereof, an optical lens element and a manufacturing method, and a method for assembling a large wide-angle camera module, wherein the lens is directionally mounted on the motor by visually identifying the position of the mark, and by identifying the position of the mark, the direction of the motor housing is adapted to the direction of the circuit board.

Another advantage of the present disclosure is to provide a camera module and an optical lens thereof, an optical lens element and a manufacturing method, and a method for assembling a large wide-angle camera module, wherein in the assembling method, by visually identifying the position of the mark, during the active focusing process (active alignment process), based on the marked position, the lens is adapted to the direction of the motor, and the attachment direction of the photosensitive element is adapted to the direction of the rectangular form/shape of the circuit board, so that after the active focusing adjustment, when the effective diameter is adapted to the photosensitive region of the photosensitive element, the direction of the motor and the direction of the circuit board also meet the process of being adapted.

Another advantage of the present disclosure is to provide a camera module and an optical lens thereof, an optical lens element and a manufacturing method, and a method for assembling a large wide-angle camera module, wherein the lens comprises at least one free-form optical lens element, and an effective diameter of the free-form optical lens element is identified by means of making identification, so as to assemble the lens based on the effective diameter of the free-form optical lens element.

Another advantage of the present disclosure is to provide a camera module and an optical lens thereof, an optical lens element and a manufacturing method, and a method for assembling a large wide-angle camera module, wherein the lens comprises an identification element, and wherein the identification element is provided on a lens barrel of the lens, and the effective diameter of the free-form optical lens element in the lens is identified by the position of the identification element, so as to assemble the lens based on the effective diameter.

Another advantage of the present disclosure is to provide a camera module and an optical lens thereof, an optical lens element and a manufacturing method, and a method for assembling a large wide-angle camera module, wherein the lens comprises an identification element, and wherein the identification element is provided on the lens element of the lens, and the effective diameter of the free-form optical lens element in the lens is identified by the position of the identification element, so as to assemble the lens based on the effective diameter.

Another advantage of the present disclosure is to provide a camera module and an optical lens thereof, an optical lens element and a manufacturing method, and a method for assembling a large wide-angle camera module, wherein the marking element is formed in a manner of being black-painted, black-plated or affixed with a black identifiable marking outside the effective diameter portion of the free-form optical lens element, so as to identify the effective diameter portion of the free-form optical lens element through a machine vision identification system.

Another advantage of the present disclosure is to provide a camera module and an optical lens thereof, an optical lens element and a manufacturing method, and a method for assembling a large wide-angle camera module, wherein the identification element with light-shielding performance is provided on an outer side of a structured light portion corresponding to the free-form optical lens element, the position and shape of the target surface formed by the lens are identified by the identification element, and stray light entering the lens barrel is shielded by the identification element.

Another advantage of the present disclosure is to provide a camera module and an optical lens thereof, an optical lens element and a manufacturing method, and a method for assembling a large wide-angle camera module, wherein the identification element can be implemented as an identification groove, and wherein the identification groove is formed on a lens element of the lens, and the effective diameter direction of the free-form optical lens element is marked by the position of the identification groove that can be visually identified, which is advantageous to simplify the manufacturing process.

Another advantage of the present disclosure is to provide a camera module and an optical lens thereof, an optical lens element and a manufacturing method, and a method for assembling a large wide-angle camera module, wherein the lens identifies the effective diameter, which is advantageous to simplify the assembly process steps of the large wide-angle camera module, realize the rapid assembly of the large wide-angle camera module with the free-form optical lens element, and improve the production and processing efficiency of the large wide-angle camera module.

Another advantage of the present disclosure is to provide a camera module and an optical lens thereof, an optical lens element and a manufacturing method, and a method for assembling a large wide-angle camera module, wherein the assembling equipment of the camera module determines the mounting direction of the lens by visually identifying the identification element, which is advantageous to simplify the mounting steps and improve the mounting accuracy.

Another advantage of the present disclosure is to provide a camera module and an optical lens thereof, an optical lens element and a manufacturing method, and a method for assembling a large wide-angle camera module, wherein the lens surface of the lens is formed with the identification element by means of setting a hole or providing a protruding identification point at a specific position, which simplifies the processing and manufacturing procedure of the lens.

Another advantage of the present disclosure is to provide a camera module and an optical lens thereof, an optical lens element and a manufacturing method, and a method for assembling a large wide-angle camera module, wherein the optical lens element has a free-form surface to correct aberration and reduce distortion.

Another advantage of the present disclosure is to provide a camera module and an optical lens thereof, an optical lens element and a manufacturing method, and a method for assembling a large wide-angle camera module, wherein the effective region of the optical lens element allowing light to pass through to participate in imaging is designed as a free-form surface, so as to reduce the design difficulty and processing difficulty of free-form surface.

Another advantage of the present disclosure is to provide a camera module and an optical lens thereof, an optical lens element and a manufacturing method, and a method for assembling a large wide-angle camera module, wherein a shape of an outer periphery of the optical lens element is adapted to a shape of an inner wall of a lens barrel, to reduce the assembly difficulty of the optical lens, so that the optical lens element can be assembled on the existing optical lens.

Another advantage of the present disclosure is to provide a camera module and an optical lens thereof, an optical lens element and a manufacturing method, and a method for assembling a large wide-angle camera module, wherein the optical lens element comprises an imaging portion, a transition portion and an assembling portion, the transition portion connects the imaging portion and the assembling portion, and adapts to the shapes of the assembling portion and the imaging portion, so as to avoid design restrictions on the imaging portion and the assembling portion.

Another advantage of the present disclosure is to provide a camera module and an optical lens thereof, an optical lens element and a manufacturing method, and a method for assembling a large wide-angle camera module, wherein the imaging portion of the optical lens element is designed to have a free-form surface, which can reduce the distortion of the large wide-angle lens, and correct aberration.

Another advantage of the present disclosure is to provide a camera module and an optical lens thereof, an optical lens element and a manufacturing method, and a method for assembling a large wide-angle camera module, wherein the optical lens comprises a non-imaging portion, and the non-imaging portion is formed in the outer periphery of the imaging portion and is adapted to the shape of the existing lens barrel, so as to reduce the assembly difficulty of the optical lens element and thus of its imaging portion.

Another advantage of the present disclosure is to provide a camera module and an optical lens thereof, an optical lens element and a manufacturing method, and a method for assembling a large wide-angle camera module, wherein a light-blocking treatment is performed on the non-imaging portion, to prevent light from passing through the non-imaging portion to interfere with imaging.

Another advantage of the present disclosure is to provide a camera module and an optical lens thereof, an optical lens element and a manufacturing method, and a method for assembling a large wide-angle camera module, wherein the shape of the imaging portion is adapted to the shape of a photosensitive element of the optical lens, improving the utilization rate of the photosensitive element.

Another advantage of the present disclosure is to provide a camera module and an optical lens thereof, an optical lens element and a manufacturing method, and a method for assembling a large wide-angle camera module, wherein the height difference between the transition portion and the imaging portion is eliminated, to reduce the undesirable influences possibly caused by the height difference.

Another advantage of the present disclosure is to provide a camera module and an optical lens thereof, an optical lens element and a manufacturing method, and a method for assembling a large wide-angle camera module, wherein a light-blocking treatment is performed on a fault plane between the transition portion and the imaging portion, so as to reduce the influences of light refraction and reflection caused by the height fault.

Another advantage of the present disclosure is to provide a camera module and an optical lens thereof, an optical lens element and a manufacturing method, and a method for assembling a large wide-angle camera module, wherein the optical lens is assembled to the large wide-angle lens, and the inclination angle of the light is reduced by a free-form surface, so as to reduce the distortion and correct aberration.

Another advantage of the present disclosure is to provide a camera module and an optical lens thereof, an optical lens element and a manufacturing method, and a method for assembling a large wide-angle camera module, wherein the optical lens element with the free-form surface reduces distortion, improves the resolution capability of the large wide-angle lens, and reduces the dependence on distortion correction software.

Other advantages and features of the present disclosure will be fully embodied from the following detailed description and can be realized through the combinations of means and devices particularly pointed out in the appended claims.

According to one aspect of the present disclosure, the present disclosure provides an optical lens comprising a lens barrel, at least one first lens element unit and at least one second lens element unit, wherein the first lens element unit and the second lens element unit are disposed in the lens barrel, and the first lens element unit is configured as a non-rotating body, wherein the optical lens is further provided with at least one notch, and wherein the notch is provided on the lens barrel, and the first lens element unit is marked by means of the notch.

According to an embodiment of the present disclosure, the first lens element unit comprises an effective diameter portion and a structural portion, wherein the structural portion extends outward from the effective diameter portion, and the notch is located at a fixed preset angle relative to the effective diameter portion of the first lens element unit, so as to determine the position and angle of the effective diameter portion according to a position of the notch.

According to an embodiment of the present disclosure, the lens barrel comprises a lens barrel main body and is further provided with a lens element mounting cavity, wherein the first lens element unit and the second lens element unit are fixed in the lens element mounting cavity by the lens barrel main body.

According to an embodiment of the present disclosure, the lens barrel comprises a lens barrel main body and is further provided with a lens element mounting cavity, wherein the first lens element unit and the second lens element unit are fixed in the lens element mounting cavity by the lens barrel main body, and wherein the first lens element unit is directionally mounted in the lens element mounting cavity based on the position of the notch.

According to an embodiment of the present disclosure, the lens barrel main body of the lens barrel has a lens barrel inner wall and a lens barrel outer wall, wherein the notch is formed in the lens barrel inner wall in a cut-edge (or edge-trimming) manner.

According to an embodiment of the present disclosure, the lens barrel main body of the lens barrel has a lens barrel inner wall and a lens barrel outer wall, wherein the notch penetrates the lens barrel inner wall and the lens barrel outer wall in a cut-edge (or edge-trimming) manner.

According to an embodiment of the present disclosure, the first lens element unit further comprises an identification portion, wherein the identification portion extends radially outward from the structural portion, and wherein the identification portion correspondingly marks the effective diameter portion, and the notch is adapted to the identification portion, so that the first lens element unit is engaged with the notch.

According to another aspect of the present disclosure, the present disclosure further provides an optical lens comprising a lens barrel and an optical system, wherein the optical system is disposed in the lens barrel, the optical system further comprises at least one first lens element unit and at least one second lens element unit, wherein the first lens element unit and the second lens element unit are disposed in the lens barrel, wherein the first lens element unit is configured as a non-rotating body, wherein the optical lens is further provided with at least one notch, and wherein the notch is provided on the optical system, and the first lens element unit is marked by means of the notch.

According to an embodiment of the present disclosure, the first lens element unit comprises an effective diameter portion and a structural portion, wherein the structural portion extends outward from the effective diameter portion, and the notch is located at a fixed preset angle relative to the effective diameter portion of the first lens element unit, so as to determine the position and angle of the effective diameter portion according to a position of the notch.

According to an embodiment of the present disclosure, the notch is formed in the at least one first lens element unit of the optical system, wherein the notch corresponds to the effective diameter portion of the first lens element unit, so as to identify the position and shape of the effective diameter portion according to the identified notch.

According to an embodiment of the present disclosure, the notch is formed in the at least one second lens element unit of the optical system, wherein the notch corresponds to the effective diameter portion of the first lens element unit, so as to identify the position and shape of the effective diameter portion according to the identified notch.

According to an embodiment of the present disclosure, the lens barrel comprises a lens barrel main body and at least one identification unit, wherein the identification unit is adapted to the notch, and when the first lens element unit is mounted on the lens barrel main body, the identification unit is inserted into the notch.

According to an embodiment of the present disclosure, the lens barrel comprises a lens barrel main body and at least one identification unit, wherein the identification unit is adapted to the notch, and when the first lens element unit is mounted on the lens barrel main body, the identification unit is inserted into the notch.

According to another aspect of the present disclosure, the present disclosure further provides a camera module, comprising:
  a photosensitive assembly; and
  an optical lens, wherein the optical lens is disposed on the photosensitive assembly, and the optical lens comprises a lens barrel, at least one first lens element unit and at least one second lens element unit, wherein the first lens element unit and the second lens element unit are disposed in the lens barrel, and the first lens element unit is configured as a non-rotating body, wherein the optical lens is further provided with at least one notch, and wherein the notch is provided on the lens barrel, and the first lens element unit is marked by means of the notch.

According to an embodiment of the present disclosure, the first lens element unit comprises an effective diameter portion and a structural portion, wherein the structural portion extends outward from the effective diameter portion, and the notch is located at a fixed preset angle relative to the effective diameter portion of the first lens element unit, so as to determine the position and angle of the effective diameter portion according to a position of the notch.

According to an embodiment of the present disclosure, the first lens element unit and the second lens element unit form an imaging plane on an upper surface of the photosensitive element, and mounting positions of the optical lens and the photosensitive assembly are adjusted based on a position and angle of the imaging plane.

According to an embodiment of the present disclosure, the photosensitive assembly comprises a circuit board and a photosensitive element, wherein the photosensitive element is conductively disposed on the circuit board, and wherein the optical lens is disposed on a photosensitive path of the photosensitive element.

According to an embodiment of the present disclosure, the camera module further comprises an optical lens fixing device, wherein the lens barrel of the optical lens is directionally fixed to the optical lens fixing device based on the position of the identification element, and a relative position of the imaging plane to a photosensitive imaging region of the photosensitive element is identified by the position of the identification element visually identified, to further adjust the optical lens fixing device, so that the imaging plane is adapted to the photosensitive imaging region of the photosensitive element.

According to an embodiment of the present disclosure, the camera module further comprises a motor and a motor housing, wherein the lens barrel is directionally locked to the motor housing by the motor at a fixed height based on the position of the identification element, and a relative position of the imaging plane to a photosensitive imaging region of the photosensitive element is identified by the position of the identification element visually identified, to further adjust the motor housing, so that the imaging plane is adapted to the photosensitive imaging region of the photosensitive element.

According to an embodiment of the present disclosure, the lens barrel comprises a lens barrel main body and is further provided with a lens element mounting cavity, wherein the first lens element unit and the second lens element unit are fixed in the lens element mounting cavity by the lens barrel main body, and wherein the notch is formed in the lens barrel based on the position of the imaging plane.

According to an embodiment of the present disclosure, the lens barrel comprises a lens barrel main body and is further provided with a lens element mounting cavity, wherein the first lens element unit and the second lens element unit are fixed in the lens element mounting cavity by the lens barrel main body, and wherein the first lens element unit is directionally mounted in the lens element mounting cavity based on the position of the notch.

According to an embodiment of the present disclosure, the first lens element unit further comprises an identification portion, wherein the identification portion extends radially outward from the structural portion, and wherein the identification portion correspondingly marks the effective diameter portion, and the notch is adapted to the identification portion, so that the first lens element unit is engaged with the notch.

According to an embodiment of the present disclosure, the first lens element unit further comprises an identification portion, wherein the identification portion extends radially outward from the structural portion, and wherein the identification portion correspondingly marks the effective diameter portion, and the notch is adapted to the identification portion, so that the first lens element unit is engaged with the notch.

According to another aspect of the present disclosure, the present disclosure further provides an optical lens element, which is suitable for being assembled to a lens barrel, wherein the optical lens element comprises:
 an imaging portion from which light is emitted to participate in imaging, wherein a surface of at least one side of the imaging portion is configured as a free-form surface; and
 a non-imaging portion formed on an outer periphery of the imaging portion.

According to an embodiment of the present disclosure, the non-imaging portion comprises an assembling portion and a transition portion, the transition portion is formed on the outer periphery of the imaging portion, the assembling portion is formed on an outer periphery of the transition portion, and the transition portion connects the imaging portion and the assembling portion.

According to an embodiment of the present disclosure, a shape of the assembling portion is adapted to a shape of an inner wall of the lens barrel to which it is assembled, so that the optical lens element is assembled to the lens barrel.

According to an embodiment of the present disclosure, the transition portion complements a shape of the imaging portion to be adapted to the assembling portion.

According to an embodiment of the present disclosure, a surface of at least one side of the non-imaging portion is subjected to a light-blocking treatment to block light from passing through.

According to an embodiment of the present disclosure, the transition portion and the imaging portion have a height difference, extending from a top end of a transition surface of the transition portion to a first surface of the imaging portion, to form a fault plane.

According to an embodiment of the present disclosure, the fault plane is subjected to a light-blocking treatment to prevent light from being refracted and reflected by the fault plane.

According to an embodiment of the present disclosure, a transition surface of the transition portion is connected to a first surface of the imaging portion.

According to an embodiment of the present disclosure, a shape of the imaging portion in an XY plane is symmetrical with respect to an X axis.

According to an embodiment of the present disclosure, a shape of the imaging portion in an XY plane is symmetrical with respect to a Y axis.

According to another aspect of the present disclosure, the present disclosure further provides an optical lens, comprising:
 a lens barrel having an assembling space and an inner wall defining the assembling space; and
 at least one optical lens element, the optical lens element being assembled to the assembling space, wherein the optical lens element comprises:
 an imaging portion allowing light to pass through to participate in imaging, wherein a surface of at least one side of the imaging portion is configured as a free-form surface; and
 a non-imaging portion formed on an outer periphery of the imaging portion, wherein a shape of an outer periphery of the non-imaging portion is adapted to a shape of the inner wall of the lens barrel.

According to an embodiment of the present disclosure, the non-imaging portion comprises an assembling portion and a transition portion, the transition portion is formed on the outer periphery of the imaging portion, the assembling portion is formed on an outer periphery of the transition portion, and the transition portion connects the imaging portion and the assembling portion.

According to an embodiment of the present disclosure, a shape of the assembling portion is adapted to a shape of the inner wall of the lens barrel to which it is assembled, so that the optical lens element is assembled to the assembling space of the lens barrel.

According to an embodiment of the present disclosure, the transition portion complements a shape of the imaging portion to be adapted to the assembling portion.

According to an embodiment of the present disclosure, a surface of at least one side of the non-imaging portion is subjected to a light-blocking treatment to block light from passing through.

According to an embodiment of the present disclosure, the transition portion and the imaging portion have a height difference, extending from a top end of a transition surface of the transition portion to a first surface of the imaging portion, to form a fault plane.

According to an embodiment of the present disclosure, the fault plane is subjected to a light-blocking treatment to prevent light from being refracted and reflected by the fault plane.

According to an embodiment of the present disclosure, a transition surface of the transition portion is connected to a first surface of the imaging portion.

According to an embodiment of the present disclosure, a shape of the imaging portion in an XY plane is symmetrical with respect to an X axis.

According to an embodiment of the present disclosure, a shape of the imaging portion in an XY plane is symmetrical with respect to a Y axis.

According to another aspect of the present disclosure, the present disclosure further provides a camera module, comprising:
    an optical lens, comprising:
    a lens barrel having an assembling space and an inner wall defining the assembling space; and
    at least one optical lens element, the optical lens element being assembled into the assembling space, wherein the optical lens element comprises an imaging portion and a non-imaging portion formed on an outer periphery of the imaging portion, the imaging portion allows light to pass through to participate in imaging, wherein a surface of at least one side of the imaging portion is configured as a free-form surface, and a shape of an outer periphery of the non-imaging portion is adapted to a shape of the inner wall of the lens barrel; and
    a photosensitive element disposed on a light-emitting side of the optical lens element, wherein a light beam emitted from the imaging portion forms an effective imaging region on the photosensitive element.

According to an embodiment of the present disclosure, the photosensitive element has a photosensitive region, and the effective imaging region completely covers the photosensitive region.

According to an embodiment of the present disclosure, a shape of the effective imaging region is adapted to a shape of the photosensitive region.

According to another aspect of the present disclosure, the present disclosure further provides a manufacturing method for an optical lens element, wherein the manufacturing method comprises the following steps:

(A) designing a surface of at least one side of an imaging portion to be a free-form surface; and
(B) providing a non-imaging portion on an outer periphery of the imaging portion.

According to an embodiment of the present disclosure, the step (B) further comprises the following steps:
    complementing a transition portion on the outer periphery of the imaging portion; and
    providing an assembling portion on an outer periphery of the transition portion.

According to an embodiment of the present disclosure, the step (B) further comprises the following step: designing a shape of the assembling portion to be adapted to an inner wall of a lens barrel.

According to an embodiment of the present disclosure, the step (B) further comprises the following step: performing a light-blocking treatment on a surface of at least one side of the non-imaging portion.

According to an embodiment of the present disclosure, the step (B) further comprises the following step: performing a light-blocking treatment on a fault plane caused by a height difference between the transition portion and the imaging portion.

According to an embodiment of the present disclosure, the step (B) further comprises the following step: performing a surface shape design on the transition portion to eliminate a height difference between the transition portion and the imaging portion.

Further objectives and advantages of the present disclosure will be fully embodied through the understanding of the following description and the drawings.

These and other objectives, features and advantages of the present disclosure are fully embodied by the following detailed description, drawings and claims.

BRIEF DESCRIPTION OF THE DRAWINGS

FIG. 17 is a schematic view of method steps of assembling the large wide-angle camera module according to the above preferred embodiment of the present disclosure.

DETAILED DESCRIPTION

Figure 1:
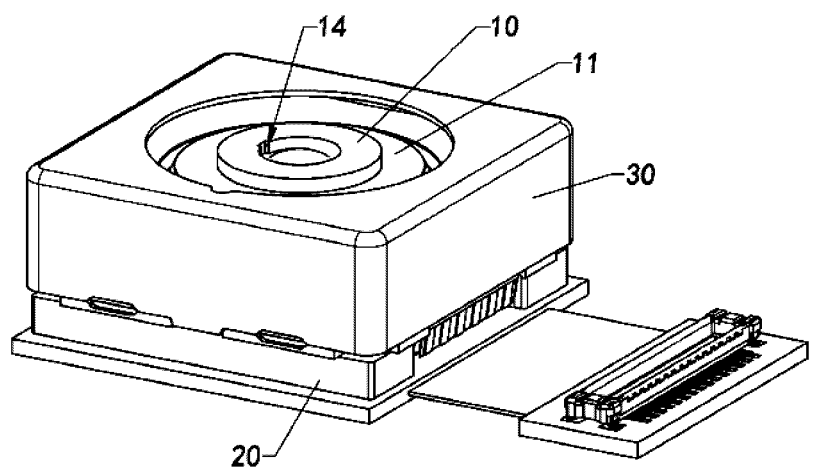
FIG. 1 is an overall schematic view of a camera module according to a first preferred embodiment of the present disclosure.

The following description is presented to disclose the present application to enable those skilled in the art to practice the present invention. Preferred embodiments in the following description are by way of example only, and other obvious modifications are conceivable to those skilled in the art. The basic principles of the present disclosure as defined in the following description may be applied to other implementations, modifications, improvements, equivalents, and other technical solutions without departing from the spirit and scope of the present disclosure.

It should be understood by those skilled in the art that in the disclosure of the present application, the orientation or positional relationship indicated by the terms "longitudinal", "transverse", "upper", "lower", "front", "rear", "left", "right", "vertical", "horizontal", "top", "bottom", "inside", "outside", etc. is based on the orientation or positional relationship shown in the drawings, which is merely for the convenience of describing the present disclosure and simplifying the description, and does not indicate or imply that the mentioned device or element must have a particular orientation and be constructed and operated in the particular orientation. Therefore, the above terms cannot be construed as a limitation of the present disclosure.

It may be understood that the term "a" or "an" should be understood to mean "at least one" or "one or more", that is, in one embodiment, the number of an element may be one, and in other embodiments, the number of the element may be multiple. The term "a" or "an" cannot be understood as a limitation on the number.

Referring to FIGS. 1 to 6 of the drawings of the description of the present disclosure, a camera module according to a first preferred embodiment of the present disclosure is set forth in the following description. The camera module includes an optical lens 10, a photosensitive assembly 20 and an optical lens fixing device 30, wherein the optical lens 10 is fixedly disposed on the optical lens fixing device 30, and when the photosensitive assembly 20 is powered on, the optical lens 10 is fixed to the photosensitive assembly 20 by the optical lens fixing device 30 based on the optical imaging performance of the photosensitive assembly 20. The optical lens 10 has an identification function, wherein the optical lens 10 is directionally disposed on the optical lens fixing device 30 based on the identification position of the optical lens 10, and a relative position of the optical lens 10 and the photosensitive assembly 20 is adjusted by means of adjusting the position of the optical lens fixing device 30.

The optical lens 10 corrects the corresponding distortion of the imaging light projected on the photosensitive assembly 20 within the field of view of the camera module, and the optical lens 10 forms an imaging plane 101 at a position corresponding to the photosensitive assembly 20, wherein the shape of the imaging plane 101 is adapted to the imaging region of the photosensitive assembly 20, so as to correct the curvature of field and distortion of the camera module in a manner of correcting by the optical lens 10. In other words, when the optical lens 10 is mounted, the optical lens 10 is fixed by the optical lens fixing device 30 with respect to the photosensitive assembly 20 in such a manner that the shape of the imaging plane 101 of the optical lens 10 is adapted to the shape of the imaging region of the photosensitive assembly 20.

Figure 2A:
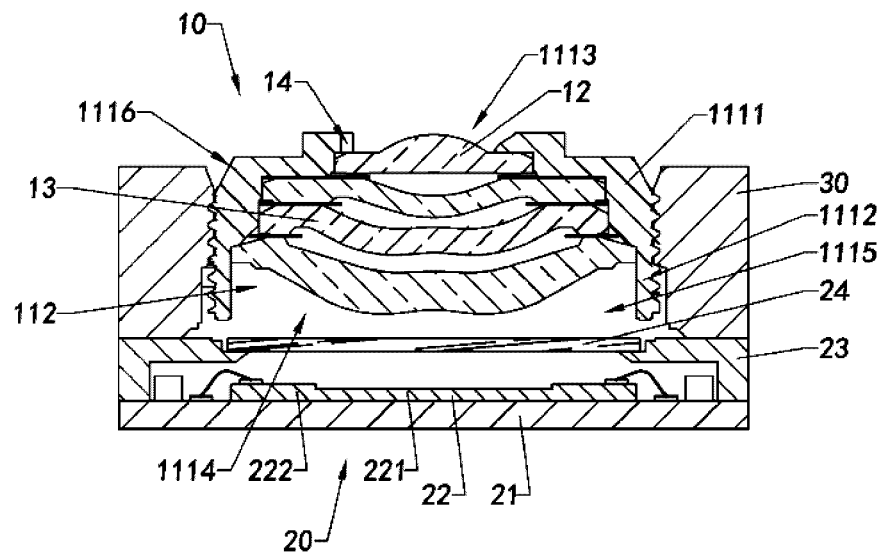
FIG. 2A is a cross-sectional view of the camera module according to the above preferred embodiment of the present disclosure.

As shown in FIG. 2A, the optical lens 10 includes a lens barrel 11, at least one first lens element unit 12 and at least one second lens element unit 13, and is further provided with at least one notch 14, wherein the at least one first lens element unit 12 and the at least second lens element unit 13 are arranged in the lens barrel 11, and the first lens element unit 12 and the second lens element unit 13 are fixed by the lens barrel 11. The notch 14 is provided on the lens barrel 11, and the position of the imaging plane 101 of the optical lens 10 is identified by the notch 14. By visually identifying the position of the notch 14, the optical lens 10 is directionally fixed to the optical lens fixing device 30, that is, the lens barrel 11 of the optical lens 10 is fixed to the optical lens fixing device 30 according to the position of the notch 14. After the optical lens 10 is fixed to the optical lens fixing device 30, the notch 14 is located at a specific position of the optical lens fixing device 30, so that the relative position of the optical lens fixing device 30 and the photosensitive assembly 20 is adjusted by visually identifying the notch 14. It is worth mentioning that, in this preferred embodiment of the present disclosure, the first lens element unit 12 and the second lens element unit 13 constitute an optical system of the optical lens 10, wherein the optical system is disposed in the lens barrel 11.

It can be understood by those skilled in the art that, in this preferred embodiment of the present disclosure, the position and shape of the imaging plane 101 formed by the optical lens 10 are related to the mounting position and mounting angle of the first lens element unit 12. Therefore, in this preferred embodiment of the present disclosure, after each of the first lens element unit 12 and the second lens element unit 13 of the optical lens 10 is assembled to the lens barrel 11, the notch 14 is provided based on the position and shape of the imaging plane 101 formed by the optical lens 10, and the position and shape of the imaging plane 101 are determined by identifying the notch 14. It will be easily conceived by those skilled in the art that the notch 14 is provided in the lens barrel 11 in advance, and each of the first lens element units 12 is directionally mounted according to the position of the notch 11, so as to determine the position and shape of the imaging plane 101 by identifying the notch 14.

Figure 3:
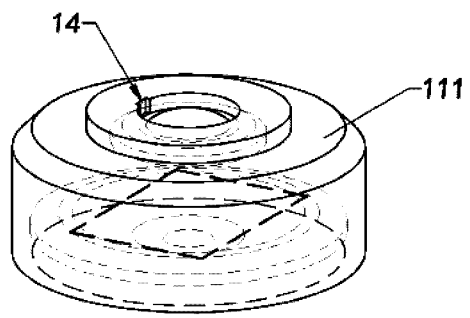
FIG. 3 is an overall schematic view of an optical lens of the camera module according to the above preferred embodiment of the present disclosure.
Figure 4:
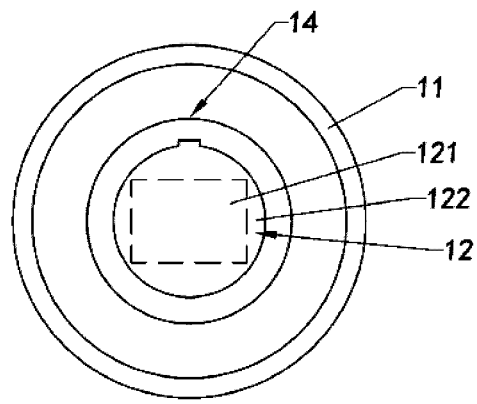
FIG. 4 is a top view of the optical lens of the camera module according to the above preferred embodiment of the present disclosure.
Figure 5:
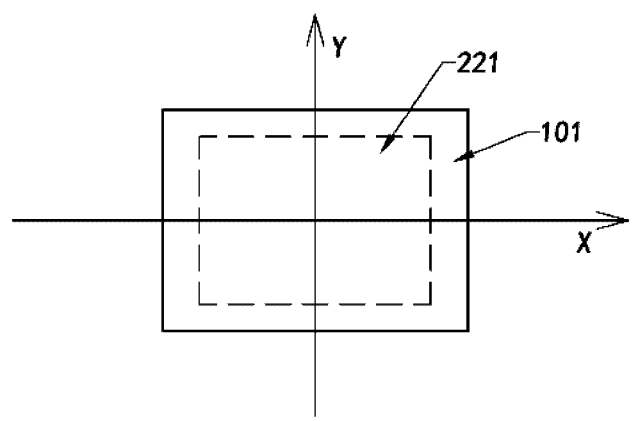
FIG. 5 is a schematic view of an imaging plane formed by the optical lens of the camera module according to the above preferred embodiment of the present disclosure.

As shown in FIGS. 3 and 4, the first lens element unit 12 includes an effective diameter portion 121 and a structural portion 122, wherein the effective diameter portion 121 is located inside the structural portion 122, external light reaches the imaging plane 101 through the effective diameter portion 121, and the external light reaches the outside of the imaging plane 101 through the structural portion 122. In short, the effective diameter portion 121 of the first lens element unit 12 corresponds to the region position of the imaging plane 101 formed by the optical lens 10. Correspondingly, the notch 14 is used to identify the position and shape of the effective diameter portion 121 of the first lens element unit 12. Illustratively, in this preferred embodiment of the present disclosure, a projection of the effective diameter portion 121 of the first lens element unit 12 along an optical axis direction presents a rectangular shape. Preferably, the notch 14 is located at the position of the lens barrel 11 corresponding to a midperpendicular plane of the effective diameter portion 121, so that the effective diameter portion 121 of the first lens element unit 12 is marked by the notch 14.

FIGS. 3 and 4 show an optional implementation of the optical lens 10 of the camera module of the present disclosure. The lens barrel 11 includes a lens barrel main body 111 and a lens element mounting cavity 112 formed in the lens barrel main body 111, wherein the second lens element unit 13 and the first lens element unit 12 are fixed to the lens element mounting cavity 112 by the lens barrel main body 111. The notch 14 is provided on the lens barrel main body 111 of the lens barrel 11, and the approximate position and shape of the imaging plane 101 formed by the optical lens 10 are determined by visually identifying the position of the notch 14.

It can be understood that the notch 14 is formed on the inner side of the lens barrel main body 111 in a cut-edge (or edge-trimming) manner, wherein the first lens element unit 12 and the second lens element unit 13 are fixedly mounted in the lens element mounting cavity 112 based on the position of the notch 14, so as to determine the approximate position and shape of the imaging plane 101 formed by the optical lens 10 by the position of the notch 14. It can be understood by those skilled in the art that a part of structure of the inner edge of the lens barrel main body 111 is cut off, so as to form the notch 14; or the notch 14 is integrally formed on the lens barrel main body 111 by means of mould forming or injection molding.

It will be easily conceived by those skilled in the art that after the first lens element unit 12 and the second lens element unit 13 are mounted in the lens element mounting cavity 112 of the lens barrel 11, the notch 14 is provided on the lens barrel main body 111 based on the imaging plane 101 formed by the optical lens 10, so as to determine the approximate position and shape of the imaging plane 101 formed by the optical lens 10 based on the visually identified notch 14.

The lens barrel main body 111 of the lens barrel 11 further includes a lens barrel upper end portion 1111 and a lens barrel lower end portion 1112 integrally extending downward from the lens barrel upper end portion 1111, wherein the lens barrel upper end portion 1111 defines an upper end opening 1113 of the lens barrel 11, and the lens barrel lower end portion 1112 defines a lower end opening 1114 of the lens barrel 11, and wherein the lens element mounting cavity 112 communicates with the upper end opening 1113 and the lower end opening 1114.

The lens barrel main body 111 further has a lens barrel inner wall 1115 and a lens barrel outer wall 1116, the lens barrel inner wall 1115 is located inside the lens barrel main body 111, and the lens barrel outer wall 1116 is located outside the lens barrel main body 111. Preferably, in this preferred embodiment of the present disclosure, the notch 14 is formed on the lens barrel upper end portion 1111 from the lens barrel inner wall 1115 in a cut-edge (or edge-trimming) manner; or the notch 14 is formed on the lens barrel lower end portion 1112 from the lens barrel inner wall 1115 in a cut-edge (or edge-trimming) manner.

In this preferred embodiment of the present disclosure, the notch 14 is provided on the lens barrel upper end portion 1111 of the lens barrel main body 111, so that assembling equipment visually identifies the position of the notch 14 at the upper end of the lens barrel 11, to identify the position and shape of the imaging plane 101 formed by the optical lens 10.

Preferably, at least one of the notches 14 corresponds to an intersection of a midperpendicular plane of a long side or a short side of the effective diameter 121 of the first lens element unit 12 and the lens barrel 111. It will be easily conceived by those skilled in the art that the positions and number of the notches 14 provided are only used here as an example, rather than a limitation. That is to say, a vision system determines the effective diameter portion 121 of the first lens element unit 12 based on the visual identification of the position of the notch 14 relative to the lens barrel main body 111, thereby determining the position and shape of the imaging plane 101. It will be easily conceived by those skilled in the art that the effective diameter portion 121 of the first lens element unit 12 can be determined by arranging two or more of the notches 14 at the position of the lens barrel main body 111, so as to determine the position and shape of the imaging plane 101.

It is worth mentioning that, in this preferred embodiment of the present disclosure, the notch 14 can be visually identified, and the position and shape of the imaging plane 101 of the optical lens 10 are identified based on the overall shape feature of the notch 14, a part of the structural shape feature of the notch 14 or the like. The notch 14 is visually identified through light. On the basis of the position or shape of the notch 14 or the like used as a positioning visual identification object, the effective diameter portion 121 of the first lens element unit 12 is marked with the positioning visual identification object as a reference, and the position and shape of the imaging plane 101 formed by the optical lens 10 are identified. The photosensitive assembly 20 includes a circuit board 21, a photosensitive element 22, a lens holder 23 and at least one filter 24, wherein the photosensitive element 22 is conductively disposed on the circuit board 21, and wherein the lens holder 23 is disposed on the circuit board 21, and the optical filter 24 is attached to the lens holder 23. The optical lens fixing device 30 is fixedly arranged on the lens holder 23 of the photosensitive assembly 20 according to the position of the notch 14. The photosensitive element 22 of the photosensitive assembly 20 has a photosensitive imaging region 221 and a non-photosensitive imaging region 222. By adjusting the relative position of the optical lens fixing device 30 and the photosensitive assembly 20, the shape of the imaging plane 101 formed by the optical lens 10 is adapted to the shape of the photosensitive imaging region 221.

It is worth mentioning that the optical lens 10 forms the imaging plane 101 on the upper surface of the photosensitive element 22, wherein the size of the imaging plane 101 is slightly larger than that of the photosensitive imaging region 221 of the photosensitive element 22, so as to make full use of the photosensitive element 22 and reserve a certain adjustment margin.

It can be understood by those skilled in the art that at least one surface of the first lens element unit 12 of the optical lens 10 is configured as a free-form surface, that is, the first lens element unit 12 is a non-rotationally symmetrical lens element. Therefore, the imaging plane 101 formed by the first lens element unit 12 is a non-circular region, that is, the optical lens 10 corrects the curvature of field and distortion of the camera module, and the region of the upper surface of the photosensitive element 22 on which light is incident is a non-rotationally symmetrical shape. Since the lens barrel 11 of the optical lens 10 is a rotationally symmetrical body, when the optical lens 10 is rotated, the imaging plane 101 formed by the optical lens 10 on the photosensitive element 22 rotates along with the rotation of the optical lens 10.

Preferably, in this preferred embodiment of the present disclosure, the imaging plane 101 formed by the optical lens 10 is a rectangular surface adapted to the shape of the photosensitive element 22. It can be understood by those skilled in the art that the shape of the imaging plane 101 of the optical lens 10 is related to the optical characteristics of the first lens element unit 12 of the optical lens 10, that is, the imaging plane 101 formed by the optical lens 10 is only used here as an example, rather than a limitation. Therefore, in other embodiments of the present disclosure, the imaging plane 101 formed by the optical lens 10 may also be implemented in other shapes.

When the optical lens fixing device 30 and the photosensitive assembly 20 are adjusted and tested to be fixed, the relative position of the imaging plane 101 and the photosensitive imaging region 221 of the photosensitive element 22 is identified by the position of the notch 14 visually identified, to further adjust the optical lens fixing device 30 or adjust the photosensitive assembly 20, so that the imaging plane 101 is adapted to the photosensitive imaging region 221 of the photosensitive element 22.

Specifically, in the process of assembling the camera module, the photosensitive assembly 20 is lit (or powered on), wherein the photosensitive assembly 20 is fixed, and the position of the optical lens fixing device 30 relative to the photosensitive assembly 20 is adjusted and fixed; or the optical lens fixing device 30 is fixed, and the position of the photosensitive assembly 20 relative to the optical lens fixing device 30 is adjusted and fixed. The assembling equipment visually identifies the notch 14, and determines the position and shape of the imaging plane 101 formed by the optical lens 10 according to the position of the notch 14. When the photosensitive assembly 20 is lit (or powered on), the relative position of the photosensitive assembly 20 and the optical lens fixing device 30 is adjusted based on the position of the notch 14, so that the imaging plane 101 formed by the optical lens 10 covers the photosensitive imaging region 221 of the photosensitive element 22.

It is worth mentioning that the first lens element unit 12 of the optical lens 10 of the camera module is configured as a non-rotationally symmetrical body. Therefore, in the adjustment and test process, the shift and tilt of the optical lens fixing device 30 or the photosensitive assembly 20, i.e., the translation in the X-axis and Y-axis directions, and the inclination in the Z-axis direction, need to be adjusted, so that the optical axis of the optical lens 10 is perpendicular to the photosensitive element 22, and the optical center of the optical lens 10 is at the center position of the photosensitive imaging region 221. In addition, rotation also needs to be considered during the active focusing process (active alignment process), that is, the imaging plane 101 formed by the optical lens 10 needs to be adapted to the shape of the photosensitive imaging region 221 of the photosensitive element 22, and the photosensitive assembly 20 or the optical lens fixing device 30 needs to be adjusted by the assembling equipment, to ensure that the imaging plane 101 formed by the optical lens 10 covers the photosensitive imaging region 221 of the photosensitive element 22.

When the imaging plane 101 formed by the optical lens 10 is a rectangle, by adjustment and test, the long side of the imaging plane 101 corresponds to the long side of the photosensitive imaging region 221, and the short side of the imaging plane 101 corresponds to the short side of the photosensitive imaging region 221. Preferably, the optical lens 10 is directionally fixed to the optical lens fixing device 30 based on the notch 14 that can be visually identified, and when the optical lens fixing device 30 and the photosensitive assembly 20 are adjusted and mounted, the imaging plane 101 formed by the optical lens 10 can cover the photosensitive imaging region 221 of the photosensitive element 22.

Figure 2B:
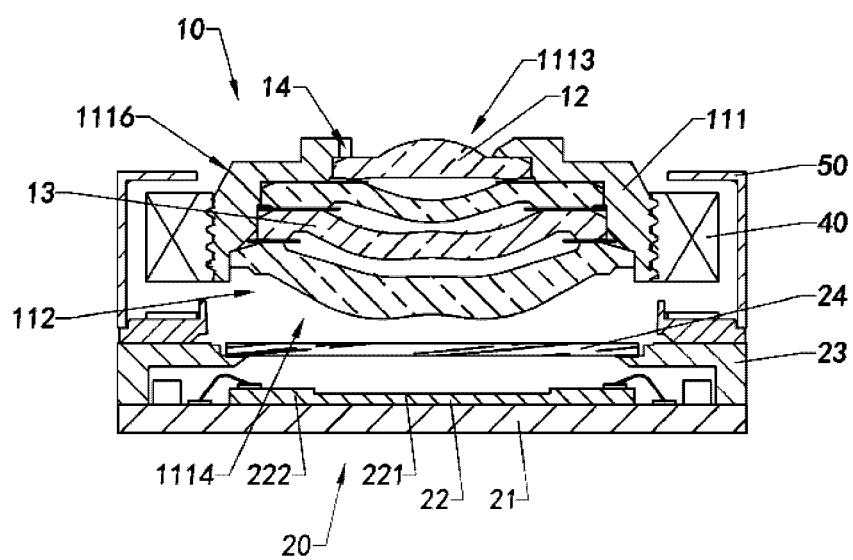
FIG. 2B is a cross-sectional view of another optional implementation of the camera module according to the above preferred embodiment of the present disclosure.

As shown in FIG. 2B, according to another aspect of the present disclosure, the camera module of the present disclosure may also be implemented as a camera module capable of auto-focusing, i.e., a camera module with a motor. Correspondingly, the camera module includes an optical lens 10, a photosensitive assembly 20, at least one motor 40 and a motor housing 50, wherein the optical lens 10 is drivably connected to the motor 40, and the movement of the optical lens 10 is driven by the motor 40 based on the motor housing 50, to adjust the focus position of the optical lens 10.

The optical lens 10 is locked to the motor housing 50 by the motor 40 at a fixed height, and the optical lens 10 is fixed to the photosensitive assembly 20 by the motor housing 50. When the optical lens 10 is fixed to the motor housing 50, the optical lens 10 is directionally disposed on the motor housing by the motor 40 based on the position of the notch 14. After the optical lens 10 is locked to the motor housing 50 at the fixed height, when the motor housing 50 is adjusted based on the position of the notch 14 to be fixed to the photosensitive assembly 20, the imaging plane 101 formed by the optical lens 10 covers the photosensitive imaging region 221 of the photosensitive element 22, and the motor housing 50 is adapted to the photosensitive assembly 20. In other words, when the imaging plane 101 covers the photosensitive imaging region 221 and the motor housing 50 is fixed to the photosensitive assembly 20, the position where the motor housing 50 is fixed is adapted to the photosensitive assembly 20, which prevents the motor housing 50 from being misaligned with the circuit board 21 of the photosensitive assembly 20, resulting in poor appearance of the camera module.

Figure 6A:
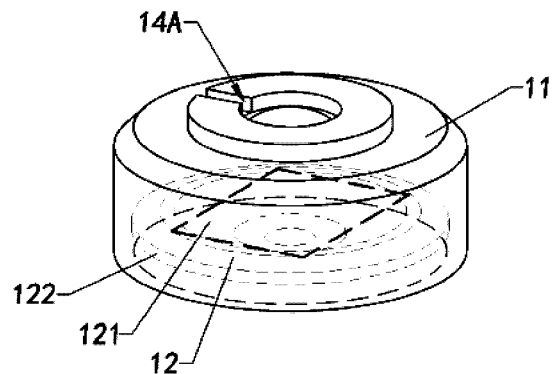
FIG. 6A is a schematic view of another optional implementation of an optical lens of the camera module according to the above preferred embodiment of the present disclosure.

As shown in FIG. 6A, another optional implementation of the optical lens 10 according to the above preferred embodiment of the present disclosure is set forth in the following description. The optical lens 10 includes a lens barrel 11, at least one first lens element unit 12, and at least one second lens element unit 13, and is further provided with at least one notch 14A. It is different from the above preferred embodiment in the notch 14A, wherein the notch 14A is formed in the lens barrel main body 111 of the lens barrel 11. In this preferred embodiment of the present disclosure, the notch 14A is implemented as a through groove penetrating the lens barrel main body 111.

In detail, the notch 14 is formed in the lens barrel main body 111 in a cut-edge (or edge-trimming) manner, wherein the notch communicates with the lens barrel inner wall 1115 and the lens barrel outer wall 1116 of the lens barrel main body 111. The first lens element unit 12 and the second lens element unit 13 are fixedly mounted in the lens element mounting cavity 112 based on the position of the notch 14, so that the approximate position and shape of the imaging plane 101 formed by the optical lens 10 is determined by the position of the notch 14. It will be easily conceived by those skilled in the art that after the first lens element unit 12 and the second lens element unit 13 are mounted in the lens element mounting cavity 112 of the lens barrel 11, the notch 14 is provided on the lens barrel main body 111 based on the imaging plane 101 formed by the optical lens 10, so as to determine the approximate position and shape of the imaging plane 101 formed by the optical lens 10 based on the visually identified notch 14.

Figure 6B:
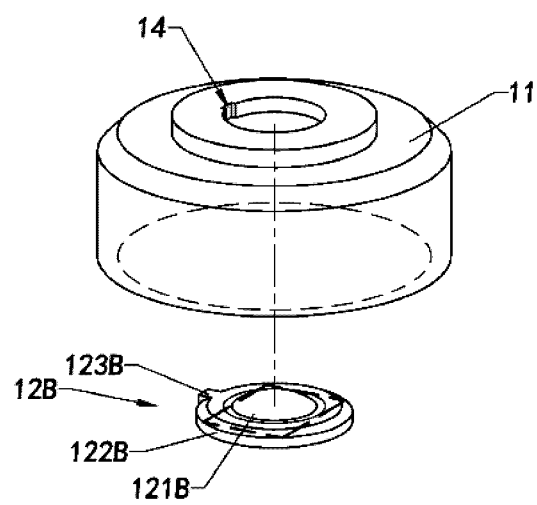
FIG. 6B is a schematic view of another optional implementation of an optical lens of the camera module according to the above preferred embodiment of the present disclosure.

As shown in FIG. 6B, another optional implementation of the optical lens 10 according to the above preferred embodiment of the present disclosure is set forth in the following description. The optical lens 10 includes a lens barrel 11, at least one first lens element unit 12B, and at least one second lens element unit 13, and is further provided with at least one notch 14. It is different from the above preferred embodiment in the first lens element unit 12B, wherein the notch 14 is adapted to the first lens element unit 12B. The notch 14 is used to mark the first lens element unit 12, and the position and shape of the imaging plane 101 formed by the optical lens 10 are identified based on the position of the notch 14.

In this preferred embodiment of the present disclosure, the first lens element unit 12B or the notch 14 of the optical lens 10 can be visually identified, in order to identify the position and shape of the imaging plane 101 formed by the optical lens 10 by the visually identified notch 14 or first lens element unit 12B.

The first lens element unit 12B includes an effective diameter portion 121B, a structural portion 122B and at least one identification portion 123B, wherein the effective diameter portion 121B is located inside the structural portion 122B, external light reaches the imaging plane 101 through the effective diameter portion 121B, and the external light reaches the outside of the imaging plane 101 through the structural portion 122B. The identification portion 123B radially extends outward from the structural portion 122B of the first lens element unit 12B.

The identification portion 123B is integrally molded on the outside of the structural portion 122B in a manner of marking the effective diameter portion 121B, that is, the position of the effective diameter portion 121 B can be identified by the position of the identification portion 123B. It can be understood by those skilled in the art that the identification portion 123B is set based on the position of the effective diameter portion 121B of the first lens element unit 12B; or the effective diameter portion 121B is fabricated by processing based on the position where the identification portion 123B is located. When the first lens element unit 12B is assembled to the lens barrel 11, the identification portion 123B of the first lens element unit 12B is inserted into the notch 14. Therefore, the effective diameter portion 121B of the first lens element unit 12B can be identified by the visually identified notch 14 or identification portion 123B, and then the position and shape of the imaging plane 101 can be identified.

Figure 7A:
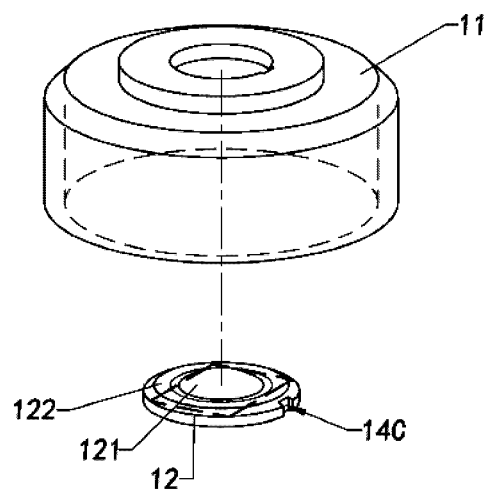
FIG. 7A is a schematic view of another optional implementation of an optical lens of the camera module according to the above preferred embodiment of the present disclosure.

As shown in FIG. 7A, another optional implementation of the optical lens 10 according to the above preferred embodiment of the present disclosure is set forth in the following description. The optical lens 10 includes a lens barrel 11, at least one first lens element unit 12, and at least one second lens element unit 13, and is further provided with at least one notch 14C. It is different from the above preferred embodiment in the notch 14C, wherein the notch 14C is formed in the first lens element unit 12, and wherein the notch 14C can be visually identified, so as to identify an imaging plane 101 of the optical lens 10 based on the notch 14C.

The first lens element unit 12 includes an effective diameter portion 121 and a structural portion 122, wherein the effective diameter portion 121 is located inside the structural portion 122, external light reaches the imaging plane 101 through the effective diameter portion 122, and the external light reaches the outside of the imaging plane 101 through the structural portion 122. Preferably, in this preferred embodiment of the present disclosure, the notch 14C is formed on the outer edge of the structural portion 122 of the first lens element unit 12 in a cut-edge (or edge-trimming)

manner. The position where the notch 14C is formed is used to mark the effective diameter portion 121 of the first lens element unit 12, so that the position and shape of the imaging plane 101 are determined based on the position of the notch 14C.

Preferably, in this preferred embodiment of the present disclosure, the notch 14C is directionally provided in the structural portion 122 according to the position of the imaging plane 101 corresponding to the first lens element unit 12, so that the notch 14C marks the structural portion 122. Optionally, during processing the first lens element unit 12, the notch 14C is preset on the edge of the first lens element unit 12, and the effective diameter portion 121 and the structural portion 122 are processed based on the position of the notch 14C, so as to fabricate the first lens element unit 12. Illustratively, the notch 14C corresponds to a midperpendicular plane corresponding to any edge of the effective diameter portion 121 of the first lens element unit 12, so that the effective diameter portion 121 can be marked by the visually identified notch 14C, so as to determine the position and shape of the imaging plane 101 based on the position of the notch 14C. It can be understood that the position where the notch 14C is provided is only used here as example, rather than a limitation.

It will be easily conceived by those skilled in the art that the notch 14C can also be formed on the inner side of the edge of the first lens element unit 12, that is, the notch 14C is formed in the structural portion 122 of the first lens element unit 12 in a manner of punching a hole. It can be understood that the notch 14C may be, but not limited to, a blind groove, a through groove, a half hole or a full through hole.

Figure 7B:
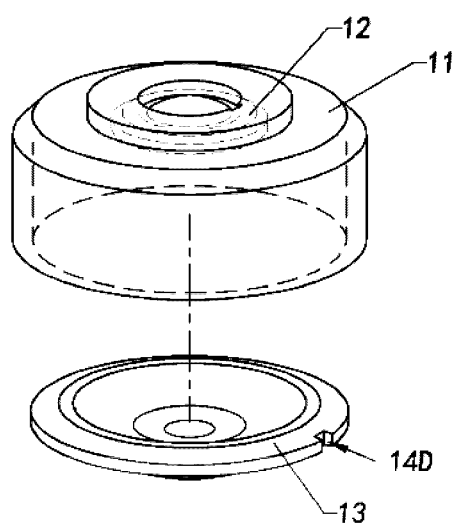
FIG. 7B is a schematic view of another optional implementation of an optical lens of the camera module according to the above preferred embodiment of the present disclosure.
Figure 8:
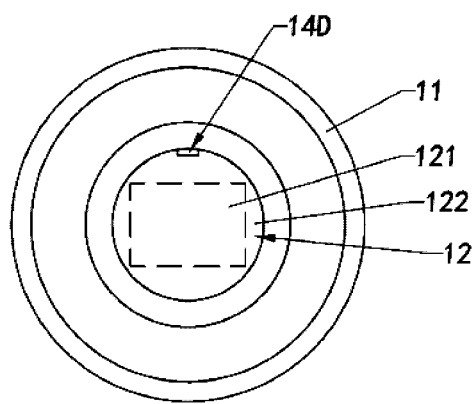
FIG. 8 is a schematic plan view of the optical lens of the camera module according to the above preferred embodiment of the present disclosure.

As shown in FIGS. 7B and 8, another optional implementation of the optical lens 10 according to the above preferred embodiment of the present disclosure is set forth in the following description. The optical lens 10 includes a lens barrel 11, at least one first lens element unit 12, and at least one second lens element unit 13, and is further provided with at least one notch 14D. It is different from the above preferred embodiment in the notch 14D, wherein the notch 14D is formed in the second lens element unit 13, and wherein the notch 14D can be visually identified, to identify an imaging plane 101 of the optical lens 10 based on the notch 14D.

The first lens element unit 12 includes an effective diameter portion 121 and a structural portion 122, wherein the effective diameter portion 121 is located inside the structural portion 122, external light reaches the imaging plane 101 through the effective diameter portion 122, and the external light reaches the outside of the imaging plane 101 through the structural portion 122. Preferably, in this preferred embodiment of the present disclosure, the notch 14D is formed on the outer edge of the second lens element unit 13 in a cut-edge (or edge-trimming) manner. The position where the notch 14D is formed is used to mark the effective diameter portion 121 of the first lens element unit 12, so that the position and shape of the imaging plane 101 are determined based on the position of the notch 14D. It is worth mentioning that the notch 14D formed in the second lens element unit 13 can be visually identified, so as to identify the effective diameter portion 121 of the first lens element unit 12 based on the position of the notch 14D, and confirm the position and shape of the imaging plane 101 formed by the optical lens 10.

Figure 9:
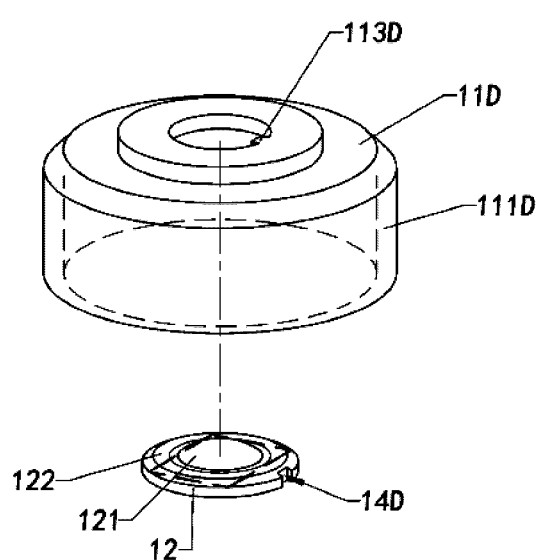
FIG. 9 is a schematic view of another optional implementation of an optical lens of the camera module according to the above preferred embodiment of the present disclosure.

As shown in FIG. 9, another optional implementation of the optical lens 10 according to the above preferred embodiment of the present disclosure is set forth in the following description. The optical lens 10 includes a lens barrel 11D, at least one first lens element unit 12, and at least one second lens element unit 13, and is further provided with at least one notch 14D. It is different from the above preferred embodiment in the notch 14D, wherein the notch 14D is formed in the first lens element unit 12 or the second lens element unit 13, and wherein the notch 14D can be visually identified, to identify an imaging plane 101 of the optical lens 10 based on the notch 14D.

The first lens element unit 12 includes an effective diameter portion 121 and a structural portion 122, wherein the effective diameter portion 121 is located inside the structural portion 122, external light reaches the imaging plane 101 through the effective diameter portion 122, and the external light reaches the outside of the imaging plane 101 through the structural portion 122. Preferably, in this preferred embodiment of the present disclosure, the notch 14D is formed on the outer edge of the structural portion 122 of the first lens element unit 12 or the second lens element unit 13 in a cut-edge (or edge-trimming) manner. The notch 14D is used to mark the effective diameter portion 121 of the first lens element unit 12, so as to determine the position and shape of the imaging plane 101 based on the position of the notch 14D.

The lens barrel 11D includes a lens barrel main body 111D and a lens element mounting cavity 112D formed in the lens barrel main body 111D, wherein the second lens element unit 13 and the first lens element unit 12 are fixed to the lens element mounting cavity 112D by the lens barrel main body 111D. The lens barrel 11D further includes at least one identification unit 113D, wherein the identification unit 113D is adapted to the shape and size of the notch 14D.

It is worth mentioning that when the first lens element unit 12 is loaded into the lens barrel main body 111D, the identification unit 113D of the lens barrel 11D corresponds to the notch 14D, to prevent the rotation of the first lens element unit 12 during the assembly process.

When the optical lens 10 is visually identified, the notch 14D or the identification unit 113D of the optical lens 10 can be visually identified as a visual identification object, and based on the position of the visual identification object, the effective diameter portion 121 of the first lens element unit 12 is identified, and the position and shape of the imaging plane 101 are confirmed.

Figure 10:
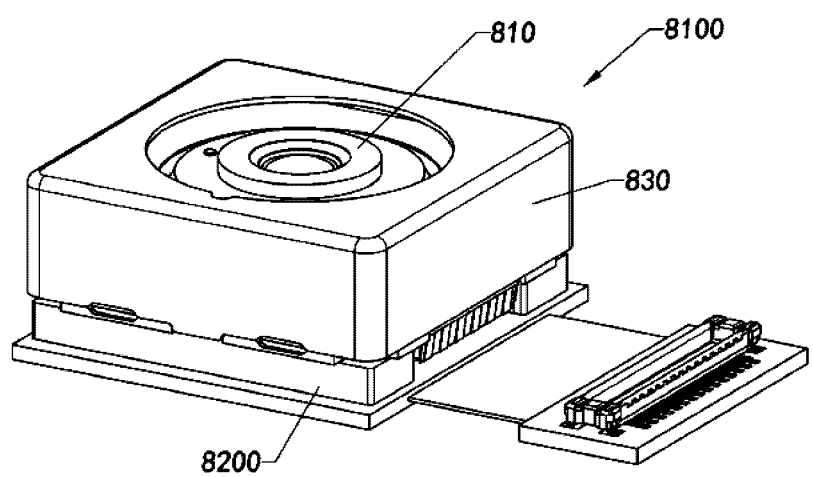
FIG. 10 is an overall schematic view of a large wide-angle camera module according to the first preferred embodiment of the present disclosure.
Figure 11A:
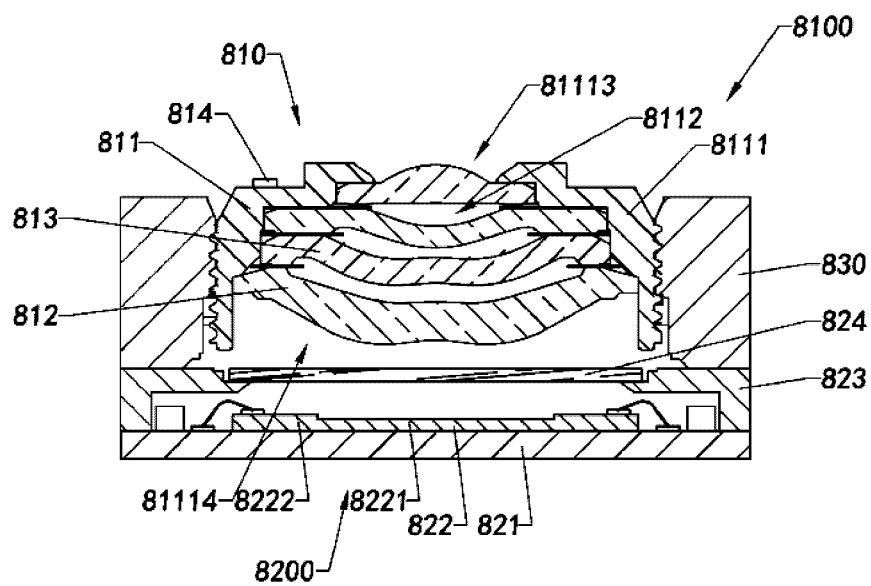
FIG. 11A is a cross-sectional view of the large wide-angle camera module according to the above preferred embodiment of the present disclosure.

Referring to FIGS. 10 and 11A of the drawings of the description of the present disclosure, an assembling method of a large wide-angle camera module according to another preferred embodiment of the present disclosure is set forth in the following description. The large wide-angle camera module includes a lens assembly 8100 and a photosensitive assembly 8200, and the lens assembly 8100 is fixed to the photosensitive assembly 8200 by the assembly method. In this preferred embodiment of the present disclosure, the lens assembly 8100 is provided with a marking. During the assembly process, the marking provided on the lens assembly 8100 can be identified by a visual identification system of assembling equipment, and a relative position of the lens assembly 8100 and the photosensitive assembly 8200 is adjusted based on the position of the visually identified marking, so that the lens assembly 8100 matches the photosensitive assembly 8200, and the photosensitive assembly 8200 can image normally.

An optional implementation of the lens assembly 8100 of the large wide-angle camera module of the present disclosure is as shown in FIG. 11A. The lens assembly 8100 includes a lens 810 and a lens fixing device 830, wherein the lens 810 is fixedly disposed on the lens fixing device 830, and the lens 810 is fixed to the photosensitive assembly 8200 by the lens fixing device 830 based on the optical imaging performance of the photosensitive assembly 8200 when the photosensitive assembly 8200 is powered on. The lens 810 has an identification function, wherein the lens 810 is directionally disposed on the lens fixing device 830 based on the identification position of the lens 810, and a relative position of the lens 810 and the photosensitive assembly 8200 is adjusted in a manner of adjusting the position of the lens fixing device 830.

In this preferred embodiment of the present disclosure, the assembly equipment of the large wide-angle camera module identifies the lens assembly 8100, and clamps and fixes the visually identified lens assembly 8100, and the assembly equipment adjusts a relative position of the lens assembly 8100 relative to the photosensitive assembly 8200 so that the mounting position of the lens assembly 8100 is adapted to the photosensitive assembly 8200, that is, the photosensitive assembly 8200 obtains a clear and reliable imaging effect. It will be easily conceived by those skilled in the art that, after the lens assembly 8100 is clamped by the assembling equipment of the wide-angle camera module, the relative position of the lens assembly 8100 relative to the photosensitive assembly 8200 can be adjusted so that the photosensitive assembly 8200 is adapted to the lens assembly 8100.

The lens 810 corrects the corresponding distortion of the imaging light projected on the photosensitive assembly 8200 within the field of view of the large wide-angle camera module, and the lens 810 forms a target plane 8101 at a position corresponding to the photosensitive assembly 8200, wherein the shape of the target plane 8101 is adapted to the imaging region of the photosensitive assembly 8200, and the curvature of field and distortion of the large wide-angle camera module are corrected by the correction function of the lens 810. In other words, when the lens 810 is mounted, the photosensitive assembly 8200 is fixed by the lens fixing device 830 in such a manner that the shape of the target plane 8101 of the lens 810 is adapted to the shape of the imaging region of the photosensitive assembly 8200.

As shown in FIG. 11A, the lens 810 includes a lens barrel 811, at least one free-form optical lens element 812, at least one lens element unit 813 and at least one identification element 814, wherein the at least one free-form optical lens element 812 and the at least one lens element unit 813 are stacked in the lens barrel 811 in sequence, and the free-form optical lens element 812 and the lens element unit 813 are fixed by the lens barrel 811. The identification element 814 is provided on the lens barrel 811, and the position of the target plane 8101 of the lens 810 is identified by the identification element 814. By visually identifying the position of the identification element 814, the lens 810 is directionally fixed to the lens fixing device 830, that is, the lens barrel 811 of the lens 810 is fixed to the lens fixing device 830 according to the position of the identification element 814. After the lens 810 is fixed to the lens fixing device 830, the identification element 814 is located at a specific position of the lens fixing device 830, so as to adjust the relative position of the lens fixing device 830 and the photosensitive assembly 8200 by visually identifying the identification element 814.

A visual identification system of the assembly equipment can identify the identification element 814 of the lens 810, wherein after the identification element 814 is identified by the visual identification system, the lens 810 is clamped by a clamping and fixing device of the assembly equipment, and the position of the lens 810 is adjusted according to the position of the identification element 814. The position where the lens 810 is fixed to the lens fixing device 830 is adjusted according to the position of the identification element 814, so that the assembling equipment clamps the lens fixing device 830. By operating the position and angle of the lens fixing device 830, the lens assembly 8100 is fixed to the photosensitive assembly 8200 in a manner of being adapted to the photosensitive assembly 8200.

The photosensitive assembly 8200 includes a circuit board 821, a photosensitive element 822, a lens holder 823 and at least one filter 824, wherein the photosensitive element 822 is conductively disposed on the circuit board 821, and wherein the lens holder 823 is disposed on the circuit board 821, and the optical filter 824 is attached to the lens holder 823. The lens fixing device 830 is fixedly disposed on the lens holder 823 of the photosensitive assembly 8200 according to the position of the identification element 814. The photosensitive element 822 of the photosensitive assembly 8200 has a photosensitive imaging region 8221 and a non-photosensitive imaging region 8222 surrounding the photosensitive imaging region 8221. By adjusting the relative position of the lens fixing device 830 and the photosensitive assembly 8200, the shape of the target plane 8101 formed by the lens 810 is adapted to the shape of the photosensitive imaging region 8221.

It is worth mentioning that the lens 810 forms the target plane 8101 on the upper surface of the photosensitive element 822, wherein the size of the target plane 8101 is slightly larger than that of the photosensitive imaging region 8221 of the photosensitive element 822, so as to make full use of the photosensitive element 822 and reserve a certain adjustment margin.

It can be understood by those skilled in the art that at least one surface of the free-form optical lens element 812 of the lens 810 is configured as a free-form surface, that is, the free-form optical lens element 812 is a non-rotationally symmetrical lens element. Therefore, the target plane 8101 formed by the free-form optical lens element 812 is a non-circular region, that is, the lens 810 corrects the curvature of field and distortion of the large wide-angle camera module, and the region of the upper surface of the photosensitive element 822 on which light is incident is of a non-rotationally symmetrical shape. Since the lens barrel 811 of the lens 810 is a rotationally symmetrical body, when the lens 810 is rotated, the target plane 8101 formed by the lens 810 on the photosensitive element 822 rotates along with the rotation of the lens 810.

Preferably, in this preferred embodiment of the present disclosure, the target plane 8101 formed by the lens 810 is a rectangular plane adapted to the shape of the photosensitive element 822. It can be understood by those skilled in the art that the shape of the target plane 8101 of the lens 810 is related to the optical characteristics of the free-form optical lens element 812 of the lens 810, that is, the target plane 8101 formed by the lens 810 is only used here as an example, rather than a limitation. Therefore, in other embodiments of the present disclosure, the target plane 8101 formed by the lens 810 may also be implemented in other shapes.

When the lens fixing device 830 and the photosensitive assembly 8200 are adjusted, tested and fixed, the relative position of the target plane 8101 and the photosensitive imaging region 8221 of the photosensitive element 822 is identified by the position of the notch 814 visually identified, to further adjust the lens fixing device 830 or adjust the photosensitive assembly 8200, so that the target plane 8101 is adapted to the photosensitive imaging region 8221 of the photosensitive element 822.

Specifically, in the process of assembling the large wide-angle camera module, the photosensitive assembly 8200 is lit (or powered on), wherein the photosensitive assembly 8200 is fixed, and the position of the lens fixing device 830 relative to the photosensitive assembly 8200 is adjusted and fixed; or the lens fixing device 830 is fixed, and the position of the photosensitive assembly 8200 relative to the lens fixing device 830 is adjusted and fixed. The assembling equipment visually identifies the identification element 814, and determines the position and shape of the target plane 8101 formed by the lens 810 according to the position of the identification element 814. When the photosensitive assembly 8200 is lit (or powered on), the relative position of the photosensitive assembly 8200 and the lens fixing device 830 is adjusted based on the position of the identification element 814, so that the target plane 8101 formed by the lens 810 covers the photosensitive imaging region 8221 of the photosensitive element 822.

It is worth mentioning that the free-form optical lens element 812 of the lens 810 of the large wide-angle camera module is configured as a non-rotationally symmetrical body. Therefore, in the adjustment and test process, the shift and tilt of the lens fixing device 830 or the photosensitive assembly 8200, i.e., the translation in the X-axis and Y-axis directions, and the inclination in the Z-axis direction, need to be adjusted, so that the optical axis of the lens 810 is perpendicular to the photosensitive element 822, and the optical center of the lens 810 is at the center position of the photosensitive imaging region 8221. In addition, rotation also needs to be considered during the active focusing process (active alignment process), that is, the lens assembly 8100 or the photosensitive assembly 8200 is adjusted by means of rotation, so that the imaging plane 8101 formed by the optical lens 810 is adapted to the shape of the photosensitive imaging region 8221 of the photosensitive element 822, and the photosensitive assembly 8200 or the lens fixing device 830 is adjusted by the assembling equipment, to ensure that the target plane 8101 formed by the lens 810 covers the photosensitive imaging region 8221 of the photosensitive element 822.

When the target plane 8101 formed by the lens 810 is a rectangle, by adjustment and test, the long side of the target plane 8101 corresponds to the long side of the photosensitive imaging region 8221, and the short side of the target plane 8101 corresponds to the short side of the photosensitive imaging region 8221. Preferably, the lens 810 is directionally fixed to the lens fixing device 830 based on the identification element 814 that can be visually identified, and when the lens fixing device 830 and the photosensitive assembly 8200 are adjusted and mounted, the target plane 8101 formed by the lens 810 can cover the photosensitive imaging region 8221 of the photosensitive element 822.

Figure 11B:
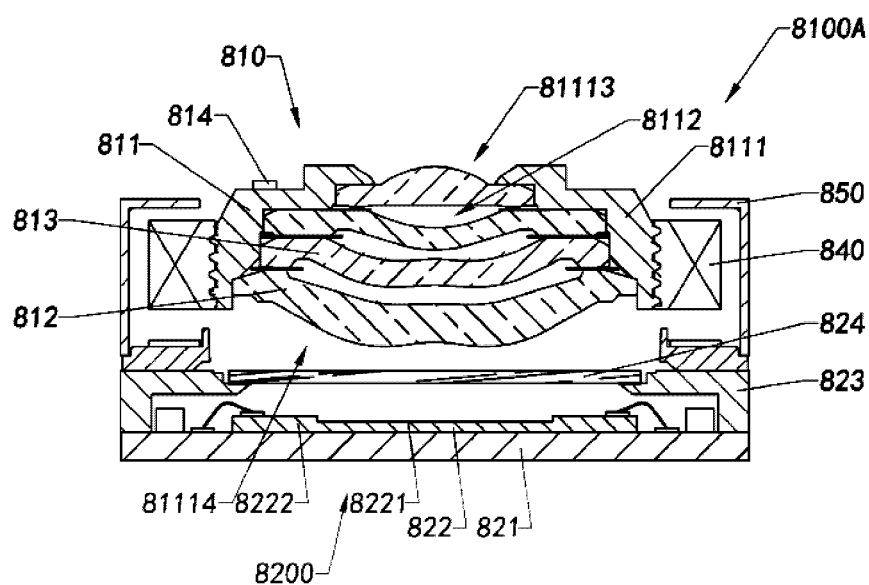
FIG. 11B is a cross-sectional view of another optional implementation of the large wide-angle camera module according to the above preferred embodiment of the present disclosure.

As shown in FIG. 11B, according to another aspect of the present disclosure, the large wide-angle camera module of the present disclosure may also be implemented as a camera module capable of auto-focusing, i.e., a camera module with a motor. Correspondingly, the large wide-angle camera module includes a lens assembly 8100A and a photosensitive assembly 8200. It is different from the above preferred embodiment in the lens assembly 8100A, wherein the lens assembly 8100A includes a lens 810, at least one motor 840 and at least one motor housing 850, the lens 810 is drivably connected to the motor 840, and the movement of the lens 810 is driven by the motor 840 based on the motor housing 850, to adjust the focus position of the lens 810.

In the preferred embodiment of the present disclosure, the lens 810 is locked to the motor housing 850 by the motor 840 at a fixed height, and the lens 810 is fixed to the photosensitive assembly 8200 by the motor housing 850. When the lens 810 is fixed to the motor housing 850, the lens 810 is directionally disposed on the motor housing 850 by the motor 840 based on the position of the identification element 814, so that the direction of the target plane 8101 formed by the lens 810 is adapted to the direction of the motor housing 850. After the lens 810 is locked to the motor housing 850 at the fixed height, when the motor housing 850 is adjusted based on the position of the identification element 814 to be fixed to the photosensitive assembly 8200, the target plane 8101 formed by the lens 810 covers the photosensitive imaging region 8221 of the photosensitive element 822, and the motor housing 850 is adapted to the photosensitive assembly 8200. In other words, when the target plane 8101 covers the photosensitive imaging region 8221 and the motor housing 850 is fixed to the photosensitive assembly 8200, the position where the motor housing 850 is fixed is adapted to the photosensitive assembly 8200, which prevents the motor housing 850 from being misaligned with the circuit board 821 of the photosensitive assembly 8200, resulting in poor appearance of the large wide-angle camera module.

The position of the target plane 8101 is determined according to the position of the identification element 814 visually identified, and the lens 810 is fixed to the motor 840 in such a manner that the direction in which the target plane 8101 is formed is adapted to the motor housing 850. Illustratively, the direction and position of the target plane 8101 are confirmed based on the position of the identification element 814, and the long-side direction of the target plane 8101 is adjusted to be parallel to one side of the motor housing 850. The attachment direction of the photosensitive element 822 is adapted to the direction of the rectangular form/shape of the circuit board 821, so that after the active focusing adjustment, when the target plane 8101 is adapted to the photosensitive imaging region 8221 of the photosensitive element 822, the directions of the motor housing 850 and the circuit board 821 also satisfy the process of being adapted to each other.

In detail, when the lens 810 is fixed on the motor housing 850, the motor housing 850 is fixed on a fixture tool for height-fixing, wherein the visual identification system of the mounting equipment identifies the identification element 814 of the lens 810 and an outer contour of the motor housing 850. A rotation adjustment angle required for the lens barrel 811 of the lens 810 to be fixed to the motor housing 850 is determined according to the identification element 814 and the outer contour of the motor housing 850 identified. The mounting equipment clamps the lens barrel 811 of the lens 810, and adjusts the mounting position of the lens barrel 811 according to the position of the identification element 814, so that one side (e.g., a long side) of the target plane 8101 formed by the lens 810 is parallel to one side of the outer contour of the motor housing 850, to ensure the parallel assembly of the lens 810 and the motor 840.

As shown in FIGS. 11A or 11B, the lens barrel 811 includes a lens barrel main body 8111 and a lens element mounting cavity 8112 formed in the lens barrel main body 8111, wherein the lens element unit 813 and the free-form optical lens element 812 are fixed to the lens element mounting cavity 8112 by the lens barrel main body 8111. The identification element 814 is provided on the lens barrel main body 8111 of the lens barrel 811, and the approximate position and shape of the imaging plane 8101 formed by the lens 810 are determined by visually identifying the position of the identification element 814.

It can be understood that the identification element 814 is integrally molded on the lens barrel main body 8111, wherein the free-form optical lens element 812 and the lens element unit 813 are fixedly mounted on the lens element mounting cavity 8112 based on the position of the identification element 814, so as to determine the approximate position and shape of the target plane 8101 formed by the lens 810 by the position of the identification element 814. It will be easily conceived by those skilled in the art that, after the free-form optical lens element 812 and the lens element unit 813 are mounted in the lens element mounting cavity 8112 of the lens barrel 811, the identification element 814 is provided on the lens barrel main body 8111 based on the target plane 8101 formed by the lens 810, so as to determine the approximate position and shape of the target plane 8101 formed by the lens 810 based on the visually identified identification element 814.

The lens barrel main body 8111 of the lens barrel 811 further includes a lens barrel upper end portion 81111 and a lens barrel lower end portion 81112 integrally extending downward from the lens barrel upper end portion 81111, wherein the lens barrel upper end portion 81111 defines an upper end opening 81113 of the lens barrel 811, and the lens barrel lower end portion 81112 defines a lower end opening 81114 of the lens barrel 811, and wherein the lens element mounting cavity 8112 communicates with the upper end opening 81113 and the lower end opening 81114.

Figure 12A:
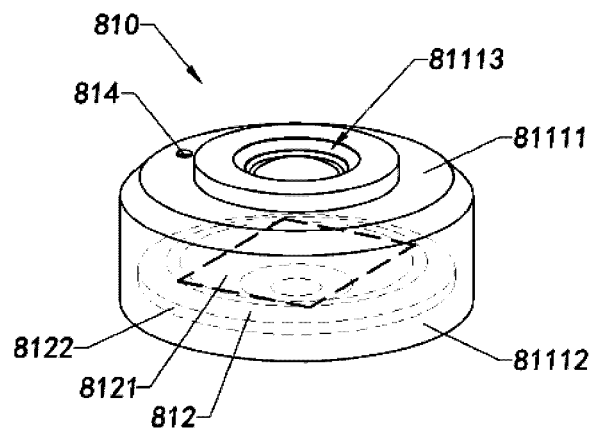
FIG. 12A is an overall schematic view of a lens of the large wide-angle camera module according to the above preferred embodiment of the present disclosure.

As shown in FIG. 12A, in this preferred embodiment of the present disclosure, the identification element 814 is provided on the lens barrel upper end portion 81111 of the lens barrel main body 8111, so that the assembling equipment visually identifies the position of the identification element 814 at the upper end of the lens barrel 811, to identify the position and shape of the target plane 8101 formed by the lens 810. Preferably, in this preferred embodiment of the present disclosure, the identification element 814 is implemented as a protrusion, wherein the identification element 814 is integrally molded on the lens barrel upper end portion 81111 of the lens barrel main body 8111.

It will be easily conceived by those skilled in the art that the identification element 814 may also be provided at other positions of the lens barrel main body 8111, such as the lens barrel lower end portion 81112 or the outer side wall of the lens barrel. That is, the position where the identification element 814 is provided is only used here as an example, rather than a limitation. The visual identification system of the assembling equipment can identify the identification elements 814 according to different positions of the identification elements 814, so as to calculate the position of the target plane 8101.

The free-form optical lens element 812 includes an effective diameter portion 8121 and a structured light portion 8122, wherein the effective diameter portion 8121 is located inside the structured light portion 8122, and wherein external light reaches the target plane 8101 through the effective diameter portion 8121, and the external light reaches the outside of the target plane 8101 through the structured light portion 8122. In short, the effective diameter portion 8121 of the free-form optical lens element 812 corresponds to the region position of the target plane 8101 formed by the lens 810. The identification element 814 is used to identify the position and shape of the effective diameter portion 8121 of the free-form optical lens element 812. Illustratively, in this preferred embodiment of the present disclosure, a projection of the effective diameter portion 8121 of the free-form optical lens element 812 along an optical axis direction presents a rectangular shape.

In this preferred embodiment of the present disclosure, the identification element 814 is provided at a specific position away from the effective diameter portion 8121. For example, the identification element 814 corresponds to a position on a midperpendicular plane of the long side of the effective diameter portion 8121. The assembling equipment can calculate the direction of the effective diameter portion 8121 of the free-form optical lens element 812 by using the visually identified identification element 814, so that the assembling equipment can adjust the relative position of the lens assembly 8100 and the photosensitive assembly 8200 according to the direction of the effective diameter portion 8121. Alternatively, the assembling device obtains the direction of the effective diameter portion 8121 of the free-form optical lens element 812 according to the identified identification element 814, and adjusts the direction of the effective diameter portion 8121 to be adapted to the direction of the motor housing 850. During the active focusing process (active alignment process) of the lens assembly 8100A, the assembling equipment clamps the motor housing 850, and when the effective diameter portion of the free-form optical lens element 812 is adapted to the imaging photosensitive region 8221 of the photosensitive element 822, the direction of the motor housing 850 and the direction of the circuit board 821 are also adapted to each other.

Preferably, the identification element 814 is provided on the lens barrel upper end portion 81111, wherein at least one identification element 814 corresponds to an intersection of a mid-axis plane of the long side or the short side of the effective diameter portion 8121 of the free-form optical lens element 812 and the lens barrel 811. It will be easily conceived by those skilled in the art that the positions and number of the identification elements 814 provided are only used here as an example, rather than a limitation. That is to say, the visual system determines the effective diameter portion 8121 of the free-form optical lens element 812 based on the visual identification of the position of the identification element 814 relative to the lens barrel main body 8111, thereby determining the position and shape of the target plane 8101. It will be easily conceived by those skilled in the art that the effective diameter portion 8121 of the free-form optical lens element 812 can be determined by arranging two or more identification elements 814 at the positions of the lens barrel main body 8111, so as to determine the position and shape of the target plane 8101.

The identification element 814 protrudes from the lens barrel upper end portion 81111 of the lens barrel main body 8111, wherein the height of the identification element 814 is between 0.1 and 0.3 mm.

Figure 12B:
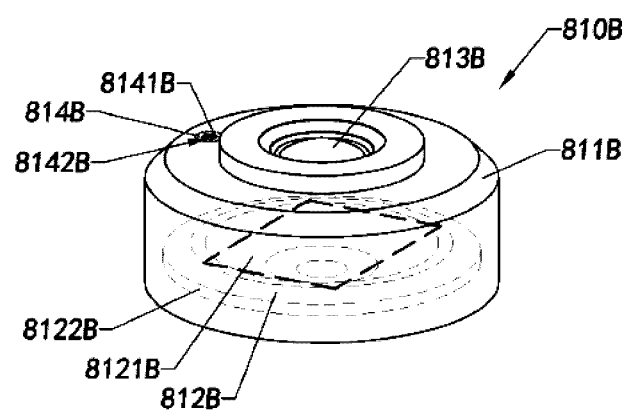
FIG. 12B is a schematic view of another optional implementation of the lens of the large wide-angle camera module according to the above preferred embodiment of the present disclosure.

As shown in FIG. 12B, according to another aspect of the present disclosure, another optional implementation of the lens 810B of the present disclosure is set forth in the following description. The lens 810B includes a lens barrel 811B, at least one free-form optical lens element 812B, at least one lens element unit 813B and at least one identification element 814B, wherein the at least one free-form optical lens element 812B and the at least one lens element unit 813B are stacked in the lens barrel 811B in sequence, and the free-form optical lens element 812B and the lens element unit 813B are fixed by the lens barrel 811B. It is different from the above preferred embodiment in the identification element 814B of the lens 810B, wherein the identification element 814B is provided on the lens barrel 811B, whereby the identification element 814B determines the position and shape of a target plane 8101 of the lens 810B.

The identification element 814B includes an identification main body 8141B and is further provided with at least one identification groove 8142B, wherein the identification groove 8142B is formed in the identification main body 8141B. The identification main body 8141B of the identification element 814B is integrally molded in the lens barrel 811B. In this preferred embodiment of the present disclosure, the identification main body 8141B of the identification element 814B and the lens barrel 811B are of an integral structure, wherein the identification groove 8142B can be visually identified, to determine the position and shape of a target plane 8101 of the lens 810B based on the position where the identification groove 8142B is located. Preferably, the depth of the identification groove 8142B is between 0.1 and 0.3 mm.

Figure 12C:
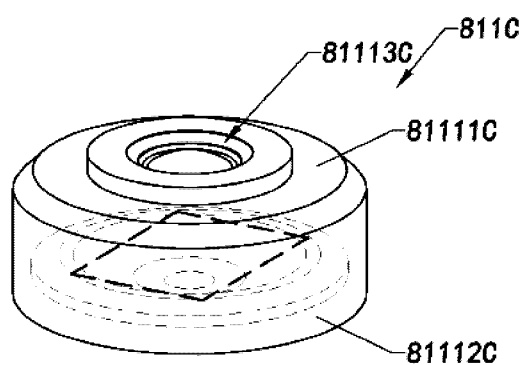
FIG. 12C is a schematic view of another optional implementation of the lens of the large wide-angle camera module according to the above preferred embodiment of the present disclosure.

As shown in FIG. 12C, according to another aspect of the present disclosure, another optional implementation of the lens 810C of the present disclosure is set forth in the following description. The lens 810C includes a lens barrel 811C, at least one free-form optical lens element 812C, at least one lens element unit 813C and at least one identification element 814C, wherein the at least one free-form optical lens element 812C and the at least one lens element unit 813C are stacked in the lens barrel 811C in sequence, and the free-form optical lens element 812C and the lens element unit 813C are fixed by the lens barrel 811C. It is different from the above preferred embodiment in the identification element 814C of the lens 810C is. In this preferred embodiment of the present disclosure, the identification element 814C of the lens 810C is a black coating provided on the structured light portion 8122C of the free-form optical lens element 12C, wherein the identification element 814C can be visually identified so as to identify the effective diameter portion 8121C of the free-form optical lens element 812C based on the shape of the identification element 814C. In other words, the identification element 814C is provided outside the effective diameter portion 8121C of the free-form optical lens element 812C, the effective diameter portion 8121C of the free-form optical lens element 812C is marked by the identification element 814C, and the position and shape of the target plane 8101C formed by the lens 810C are confirmed based on the position and shape of the identification element 814C that can be visually identified.

Preferably, in this preferred embodiment of the present disclosure, the identification element 814C is provided on the free-form optical lens element 812C, wherein the identification element 814C blocks the structured light portion 8122C. Optionally, the identification element 814C may also be provided on the lens element unit 813C, wherein the identification element 814C is attached to the lens element unit 813C in a manner corresponding to the position of the structured light portion 8122C. Optionally, the identification element 814C is provided on the lens barrel 811C of the lens 810C, wherein the identification element 814C is used to mark the position of the effective diameter portion 8121C of the free-form optical lens element 812C. It can be understood that the identification element 814C can be implemented as a light shielding element, which blocks the light entering the structured light portion 8122C and allows the light entering the effective diameter portion 8121C to pass through.

Figure 12D:
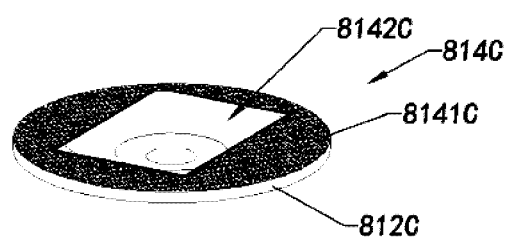
FIG. 12D is a schematic view of another optional implementation of the lens of the large wide-angle camera module according to the above preferred embodiment of the present disclosure.

As shown in FIG. 12D, according to another aspect of the present disclosure, another optional implementation of the lens 810D of the present disclosure is set forth in the following description. The lens 810D includes a lens barrel 811D, at least one free-form optical lens element 812D, at least one lens element unit 813D and at least one identification element 814D, wherein the at least one free-form optical lens element 812D and the at least one lens element unit 813D are stacked in the lens barrel 811D in sequence, and the free-form optical lens element 812D and the lens element unit 813D are fixed by the lens barrel 811D. It is different from the above preferred embodiment in the identification element 814D of the lens 810D. In this preferred embodiment of the present disclosure, the identification element 814D of the lens 810D is integrally molded on the lens barrel 811D of the lens 810D, wherein the identification element 814D forms an identification groove at the lens barrel 811D in a cut-edge (or edge-trimming) manner, and wherein the identification groove corresponds to the effective diameter 121D of the free-form optical lens element 812D, that is, the position of the effective diameter 121D of the free-form optical lens element 812D can be obtained by visually identifying the identification groove, and then the position and shape of the target plane 8101 are determined.

Figure 12E:
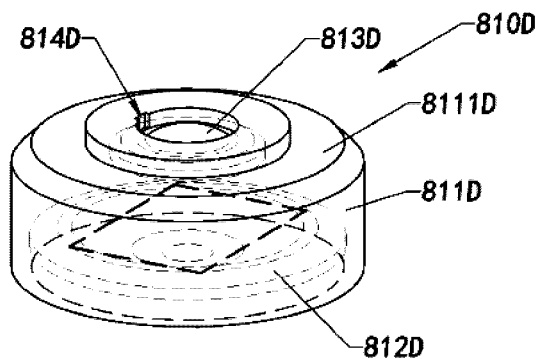
FIG. 12E is a schematic view of another optional implementation of the lens of the large wide-angle camera module according to the above preferred embodiment of the present disclosure.
Figure 12F:
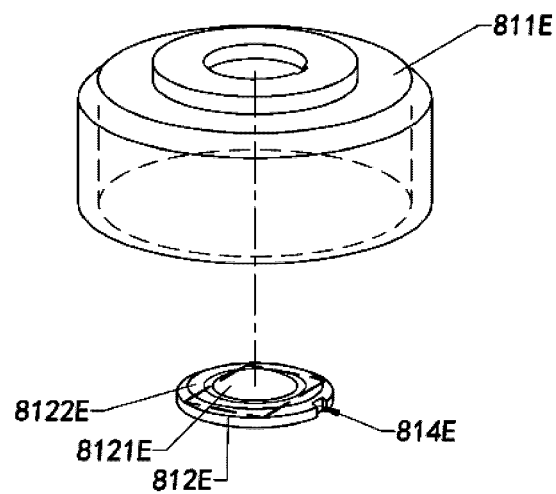
FIG. 12F is a schematic view of another optional implementation of the lens of the large wide-angle camera module according to the above preferred embodiment of the present disclosure.
Figure 13:
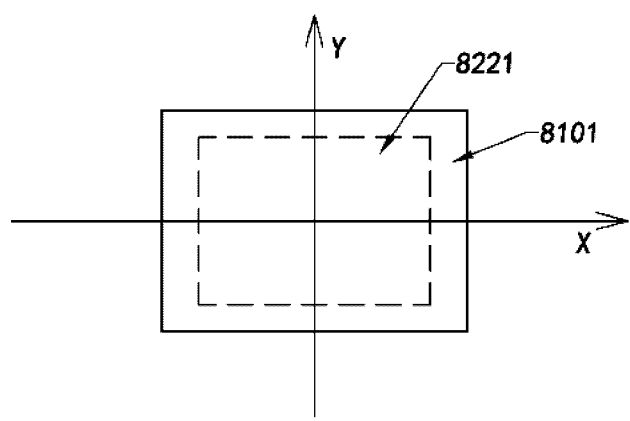
FIG. 13 is a schematic view of a target plane formed by the lens of the large wide-angle camera module according to the above preferred embodiment of the present disclosure.
Figure 14:
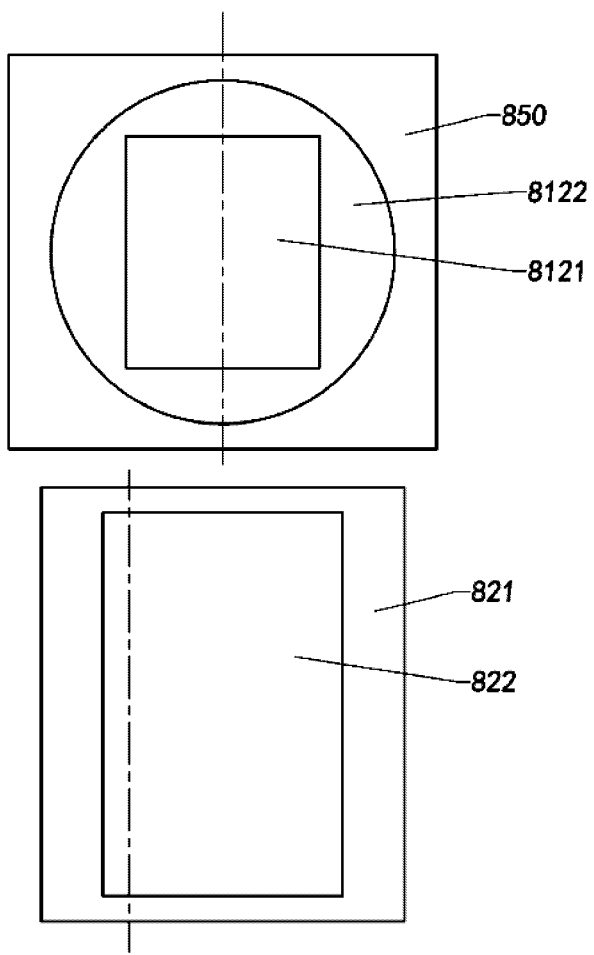
FIG. 14 is a schematic view of the lens of the large wide-angle camera module according to the above preferred embodiment of the present disclosure being mounted to a motor.
Figure 15:
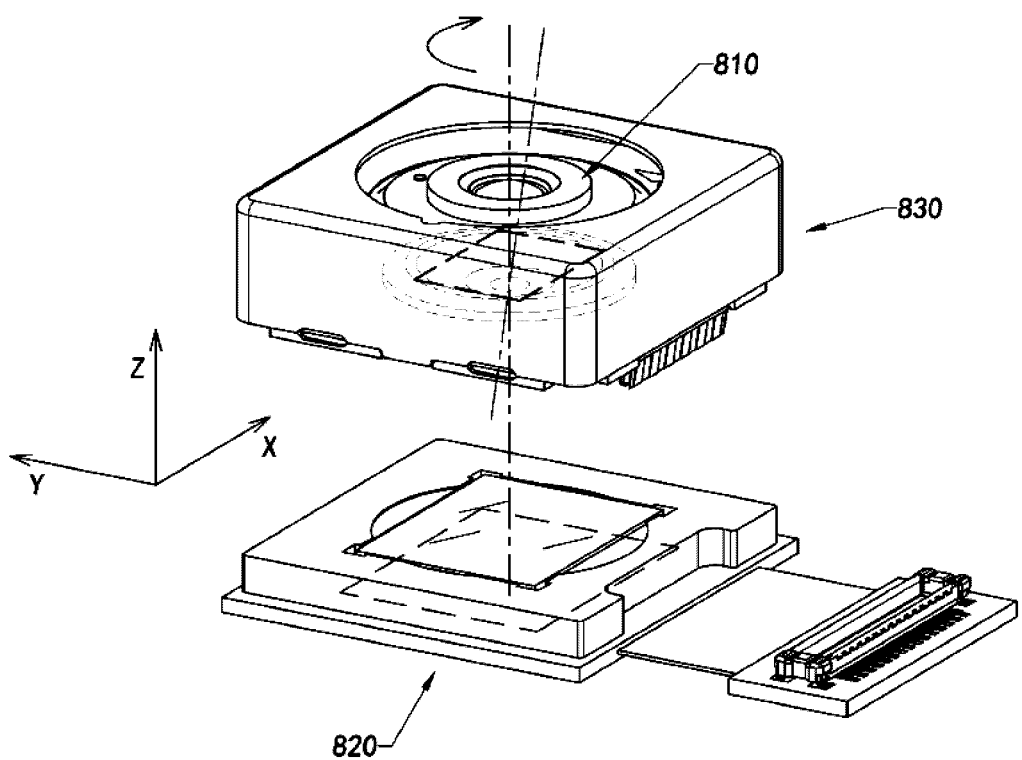
FIG. 15 is a schematic view of an adjustment action of the large wide-angle camera module according to the above preferred embodiment of the present disclosure.
Figure 16A:
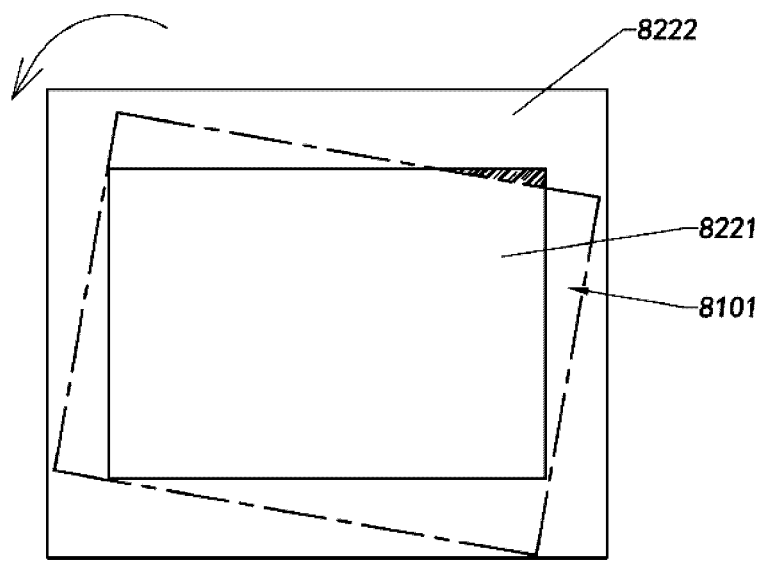
FIGS. 16A to 16D are schematic views of correction during a mounting process of the large wide-angle camera module according to the above preferred embodiment of the present disclosure.
Figure 16B:
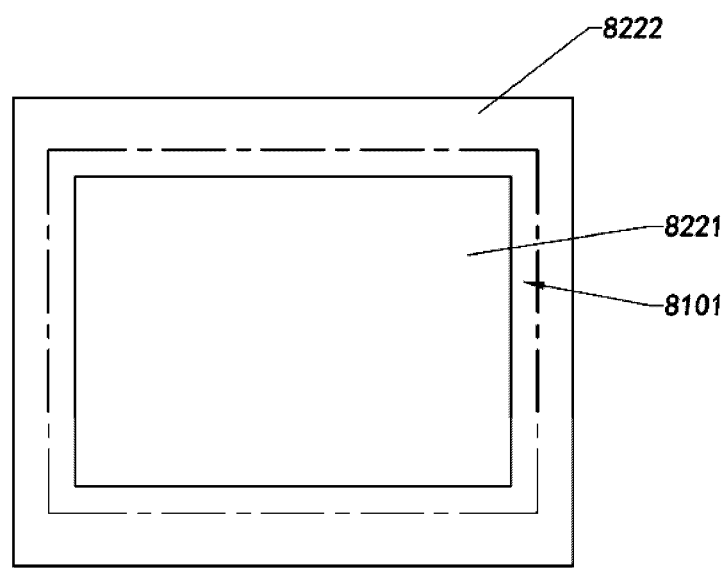
Figure 16C:
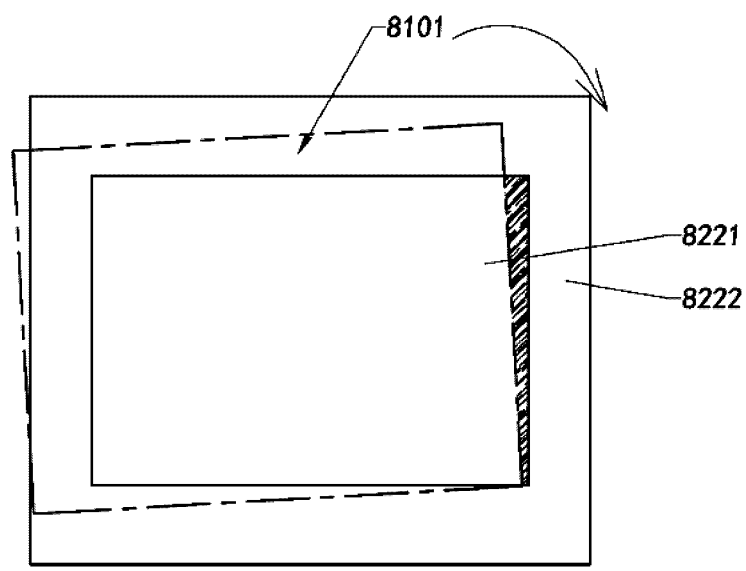
Figure 16D:
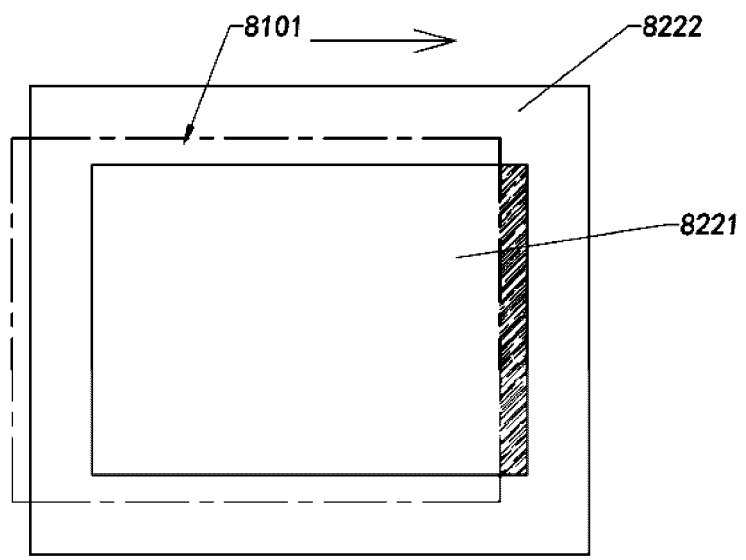

As shown in FIG. 12E, according to another aspect of the present disclosure, another optional implementation of the lens 810E of the present disclosure is set forth in the following description. The lens 810E includes a lens barrel 811E, at least one free-form optical lens element 812E, at least one lens element unit 813E and at least one identification element 814E, wherein the at least one free-form optical lens element 812E and the at least one lens element unit 813E are stacked in the lens barrel 811E in sequence, and the free-form optical lens element 812E and the lens element unit 813E are fixed by the lens barrel 811E. It is different from the above preferred embodiment in the identification element 814E of the lens 810E. In this preferred embodiment of the present disclosure, the identification element 814E of the lens 810E is integrally molded on the free-form optical lens element 812E (or the lens element unit 813E) of the lens 810E, wherein the identification element 814E forms an identification groove at an edge of the structured light portion 8122E of the free-form optical lens element 812E in a cut-edge (or edge-trimming) manner, and wherein the identification groove corresponds to the effective diameter portion 8121E of the free-form optical lens element 812E, that is, the position of the effective diameter portion 8121E of the free-form optical lens element 812E can be obtained by visually identifying the identification groove, and then the position and shape of the target plane 8101 are determined.

According to another aspect of the present disclosure, an assembling method of the large wide-angle camera module of the present disclosure includes the following steps:

(a) photographing a clamped lens assembly 8100, identifying at least one identification element 814 of a lens 810 of the lens assembly 8100 based on a visual identification system, and determining a direction of an effective diameter portion 8121 of a free-form optical lens element 812 of the lens 810 according to the identified identification element 814;

(b) electrically conducting a photosensitive assembly 8200, and obtaining image information photographed by the photosensitive assembly 8200;

(c) adjusting a position of the lens assembly 8100 relative to the photosensitive assembly 8200 based on the photographed image information, so that a target plane 8101 formed by the lens 810 covers a photosensitive imaging region 8221 of the photosensitive assembly 8200, and a clear image is formed by the photosensitive assembly 8200; and (d) fixing the lens assembly 8100 and the photosensitive assembly 8200.

In the step (a) of the assembling method of the present disclosure, the lens assembly 8100 is clamped by assembling equipment, and the visual identification system of the assembling equipment photographs the lens 810 to identify the identification element 814, wherein the identification element is provided on the lens barrel 811, the free-form optical lens element 812 or the lens element unit 813 of the lens 810 to mark the effective diameter portion 8121 of the free-form optical lens element 812. Correspondingly, in this preferred embodiment of the present disclosure, the identification element 814 may be implemented as a protrusion, a groove, or a coating or the like. Illustratively, the identification element 814 is configured as a protrusion integrally molded on the lens barrel 811, wherein the protrusion can be identified by the visual identification system; or the identification element is formed on/in the lens barrel 811 by means of drilling.

The assembling equipment visually identifies the identification element 814, and with the identification element 814 as a visual identification object, the assembling equipment calculates the position and shape of the effective diameter portion 8121 of the free-form optical lens element 812 based on the position of the visual identification object.

The following steps are further included before the step (a) of the assembling method of the present disclosure:

(a0.1) identifying the identification element 814 of the lens 810 and an outer contour of a motor housing 850; and (a0.2) fixing the lens 810 to the motor housing 850 in such a manner that the direction of the effective diameter portion 8121 of the free-form optical lens element 812 is adapted to the outer contour of the motor housing 850.

The following steps are further included in the step (a0.2) of the assembling method of the present disclosure:

calculating a rotation angle difference between the direction of the effective diameter portion 8121 of the lens 810 and the outer contour of the motor housing 850 based on the position of the identification element 814;

rotating the lens barrel 811 of the lens 810 so that one side of the effective diameter portion 8121 is parallel to one side of the motor housing 850; and dispensing and curing glue on the lens 810 and a motor 840, so that the lens 810 and the motor housing 850 are assembled in parallel.

The following steps are further included in the step (a) of the assembling method of the present disclosure:

(a.1) photographing the photosensitive assembly 8200, and identifying a position of a photosensitive element 822 of the photosensitive assembly 8200; and (a.2) preliminarily adjusting the lens assembly 8100 according to the position and direction of the effective diameter portion 8121 of the lens 810 and the position of the photosensitive element 822, so that the edge of the effective diameter portion 8121 and the contour of the photosensitive element 822 are substantially parallel.

The following steps are further included in the step (b) of the assembling method of the present disclosure:

controlling a device clamping the lens assembly 8100 to be rotated by a certain angle; and recording an image captured by the photosensitive assembly 8200 during the rotation of the lens assembly 8100.

The following steps are further included in the step (b) of the assembling method of the present disclosure:

controlling the device clamping the lens assembly 8100 to move translationally in an X/Y direction; and recording an image captured by the photosensitive assembly 8200 during the translational movement of the lens assembly 8100.

The following steps are further included in the step (c) of the assembling method of the present disclosure:

(c.1) processing the obtained image, and capturing the imaged edge of the photosensitive element 822; and (c.2) determining a correction direction of the lens assembly 8100 relative to an imaging boundary of the photosensitive element 822 according to the change of the vignetting region at the edge of the image, and calculating a correction angle of the lens assembly 8100.

The following steps are further included in the step (c) of the assembling method of the present disclosure:

(c.3) directionally driving the lens assembly 8100 to rotate based on the obtained correction angle, so that the sides of the effective diameter portion 8121 are parallel and corresponding to the sides of the photosensitive element 822 in a vertical direction; and (c.4) translating and tilting the lens assembly 8100 based on the captured image information, so that the region of a target plane 8101 formed by the lens 810 of the lens assembly 8100 covers an imaging photosensitive region 8221 of the photosensitive element 822, and the photosensitive assembly 8200 obtains a clear image.

FIGS. 18A to 22 show another preferred example of the present disclosure, wherein the present disclosure provides an optical lens element 910, the optical lens element 910 includes an imaging portion 911 and a non-imaging portion 912, and the non-imaging portion 912 is formed on the outer periphery of the imaging portion 911. The imaging portion 911 allows light to pass through to participate in imaging. The imaging portion 911 is an effective region in the optical lens element 910 that allows light to pass through to participate in imaging.

A surface of at least one side of the imaging portion 911 is configured as a free-form surface. The surface of the imaging portion 911 is designed with a free-form surface, and a progressive multifocal surface is processed on the surface of at least one side of the imaging portion 911.

The imaging portion 911 having the free-form surface is irregular and asymmetric, and has multiple axes of symmetry.

When optically designing an optical lens 9100, only the effective region allowing light to pass through for imaging, i.e., the surface of the imaging portion 911, is designed with a free-form surface, and the surface of the non-imaging portion 912 is nota free-form surface. That is to say, the part of the optical lens element 910 allowing the light participating in imaging to pass through is configured as a free-form surface. Other regions of the optical lens element 910 form the non-imaging portion 912, so that the imaging portion 911 can be suitable for being assembled.

Figure 19:
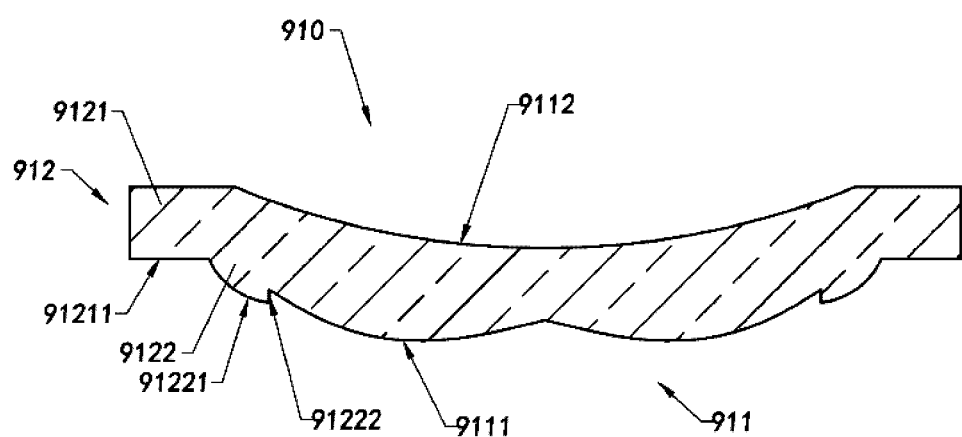
FIG. 19 is a schematic view of an optical lens element according to a preferred embodiment of the present disclosure.

Referring to FIG. 19, the non-imaging portion 912 includes an assembling portion 9121 and a transition portion 9122, and the transition portion 9122 connects the assembling portion 9121 and the imaging portion 911. The transition portion 9122 is formed on the outer periphery of the imaging portion 911, and the assembling portion 9121 is formed on the outer periphery of the transition portion 9122. The shape of the assembling portion 9121 is suitable for being assembled. The transition portion 9122 is formed between the imaging portion 911 and the assembling portion 9121 to complement the surface shape of the imaging portion 911, and transition from the imaging portion 911 to the assembling portion 9121 to form the optical lens element 910.

Figure 20A:
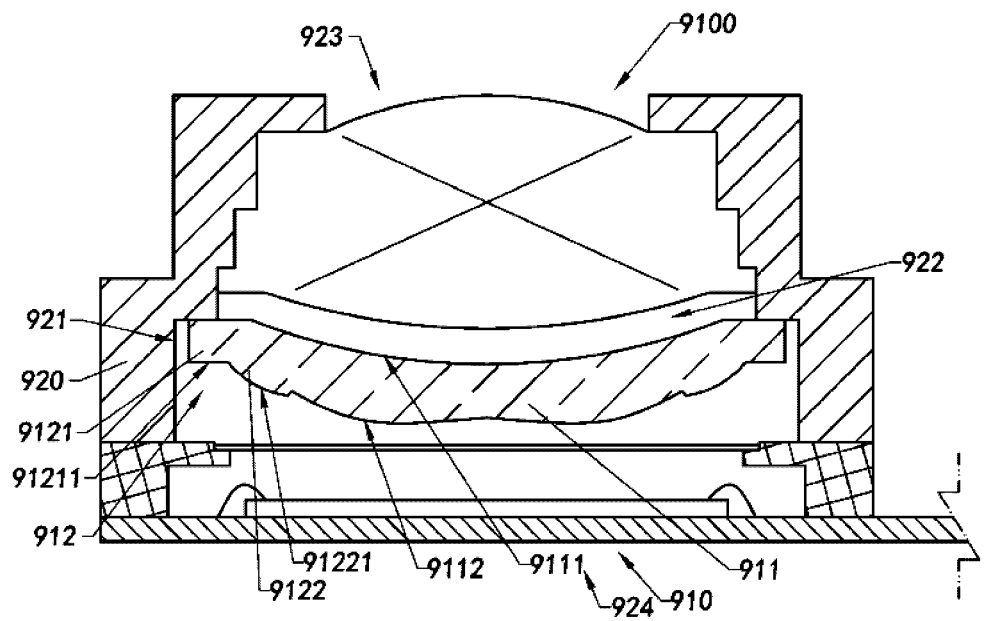
FIG. 20A is a schematic view of a camera module according to a preferred embodiment of the present disclosure.
Figure 20B:
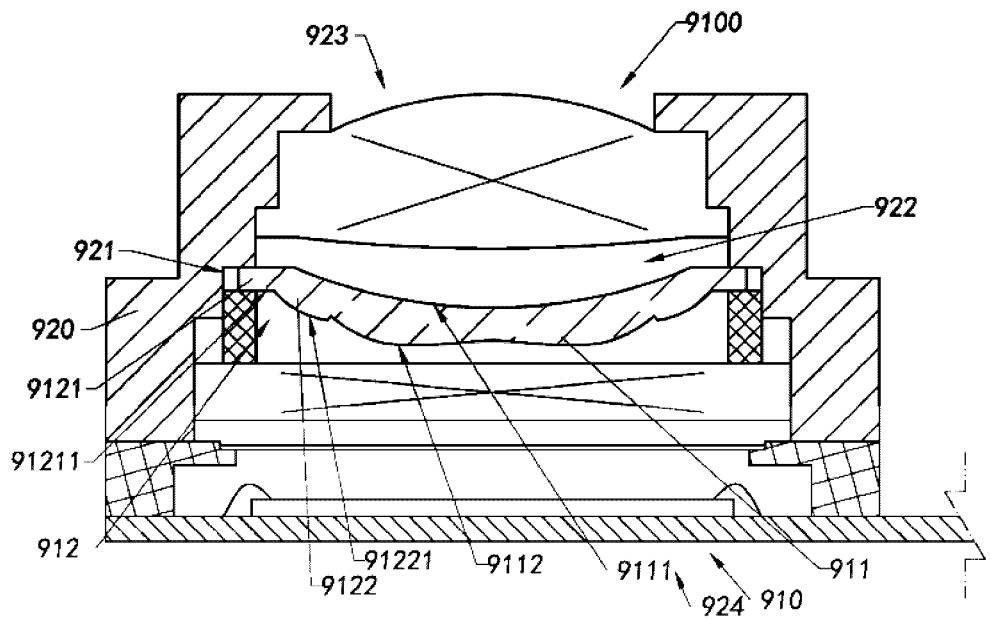
FIG. 20B is a schematic view of a camera module according to a preferred embodiment of the present disclosure.
Figure 21A:
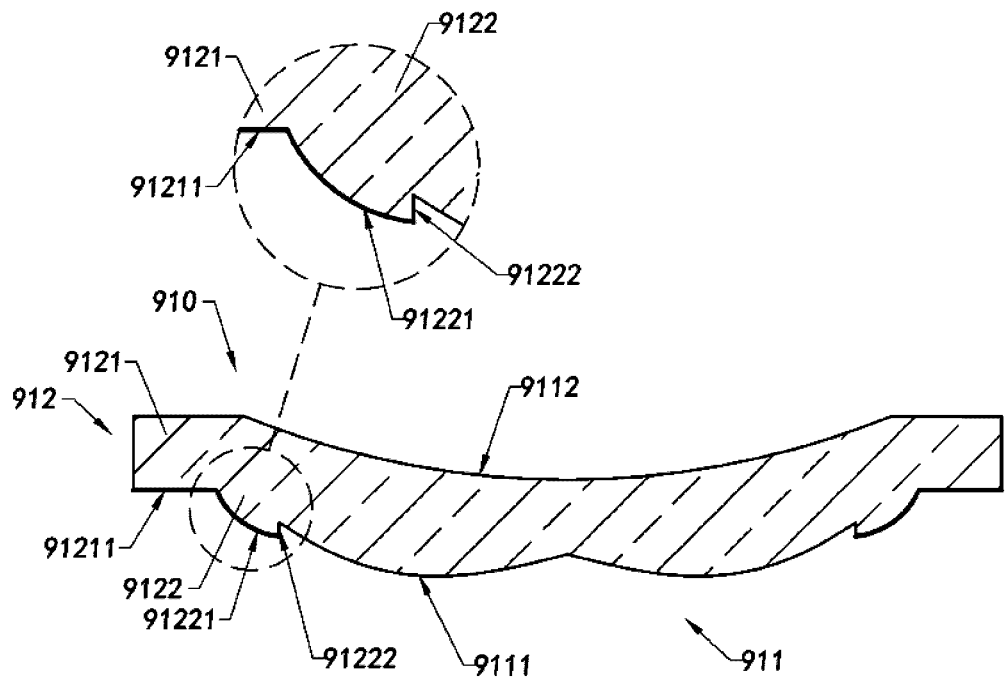
FIG. 21A is a schematic view of an optical lens element according to a preferred embodiment of the present disclosure being subjected to a light-blocking treatment.
Figure 21B:
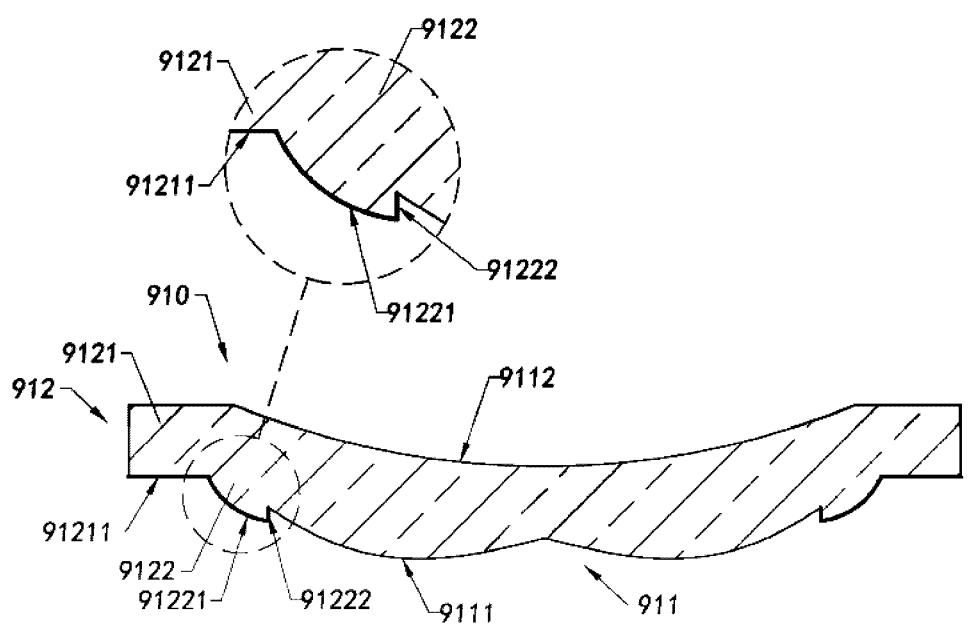
FIG. 21B is another schematic view of an optical lens element according to a preferred embodiment of the present disclosure being subjected to a light-blocking treatment.

Referring to FIGS. 20A and 20B, the present disclosure further provides a camera module, the camera module includes an optical lens 9100, the optical lens 9100 includes a lens barrel 920, and the optical lens element 910 is assembled in the lens barrel 920. The non-imaging portion 912 is suitable for being assembled to the lens barrel 920, so that the optical lens element 910 is assembled to the lens barrel 920 to overcome the assembly difficulty of the imaging portion 911 having the free-form surface.

The lens barrel 920 has an inner wall 921 and an assembling space 922, and the inner wall 921 surrounds and defines the assembling space 922. The optical lens element 910 is assembled in the assembling space 922. The lens barrel 920 further has a light entrance port 923 and a light exit port 924. Light enters the assembling space 922 from the light entrance port 923, passes through the optical lens element 910, and leaves the light exit port 924.

The light enters the lens barrel 920 from the light entrance port 923, and participates in imaging after passing through the imaging portion 911 of the optical lens element 910. That is to say, the light beam emitted from the imaging portion 911 is an effective light beam participating in the imaging. The transition portion 9122 is formed on the outer periphery of the imaging portion 911, and the light can also pass through the transition portion 9122. The light beam emitted from the transition portion 9122 is an ineffective light beam that does not participate in imaging.

The assembling portion 9121 is formed on the outer periphery of the transition portion 9122. The shape of the assembling portion 9121 is adapted to the shape of the lens barrel 920, so that the assembling portion 9121 can be assembled in the assembling space 922 of the lens barrel 920, and the optical lens element 910 is assembled in the assembling space 922.

The assembling portion 9121 and the lens barrel 920 are rotating bodies, and even if the imaging portion 911 is not rotationally symmetrical, the assembling portion 9121 and the lens barrel 920 can be adapted to each other, so that the optical lens element 910 is assembled to the lens barrel 920, the imaging portion 911 can be assembled to the assembling space 922, and light enters the lens barrel 920 from the light entrance port 923 to participate in imaging through the imaging portion 911.

The shape of the non-imaging portion 912 is adapted to the shape of the inner wall 921 of the lens barrel 920, so that the optical lens element 910 is assembled in the assembling space 922.

The surface of the imaging portion 911 is configured as a free-form surface, and the surface shape of the assembling portion 9121 can be adapted to the existing lens element mounting process, and is suitable for mounting the optical lens element 910 in the existing lens barrel, and thus improving the adaptability and ease of installation of the optical lens element 910. The inner wall 921 of the lens barrel 920 is implemented in a stepped shape, the optical lens element 910 can be inserted between the inner walls 921 of the lens barrel 920, and the assembling portion 9121 leans against the stepped region of the inner wall 921, so that the optical lens element 910 is assembled in the assembling space 922.

The assembling portion 9121 has at least one leaning surface 91211. When the optical lens element 910 is assembled in the assembling space 922 of the lens barrel 920, the assembling portion 9121 leans against the inner wall 921 of the lens barrel 920.

The imaging portion 911 of the optical lens element 910 has a first surface 911 and a second surface 912, and one or both of the first surface 911 and the second surface 912 are free-form surfaces.

The transition portion 9122 has a transition surface 91221, which extends from the leaning surface 91211 of the assembling portion 9121 to the first surface 911 of the imaging portion 911. The transition surface 91221 complements the surface shape of the first surface 9111 of the imaging portion 911, to connect the imaging portion 911 and the assembling portion 9121.

It is worth mentioning that the first surface 911 and the second surface 912 can be replaced with each other. The first surface 911 and the second surface 912 point to one of the surfaces on both sides of the imaging portion 911, not particularly.

The surface of the imaging portion 911 is designed as a free-form surface. The shape of the assembling portion 9121 is set to be suitable for the shape of the inner wall 921 of the lens barrel 920. The transition portion 9122 is provided to connect the imaging portion 911 and the assembling portion 9121, and complement the surface shape of the imaging portion 911, so that the imaging portion 911 and the assembling portion 9121 are adapted to each other.

The surface of the imaging portion 911 is designed as a free-form surface, and the non-imaging portion 912 formed on the outer periphery of the imaging portion 911 is a non-free-form surface, which is suitable for assembly, and is convenient for assembling the optical lens element 910 to the lens barrel 920. The requirement for the lens barrel 920 is low, so that the optical lens element 910 can be applied to the existing lens barrels. The non-imaging portion 912 is provided to reduce the assembly difficulty of the imaging portion 911 with the free-form surface, and enable the imaging portion 911 with the free-form surface to be assembled in the assembling space 922 of the lens barrel 920, improving the adaptability of the optical lens element 910.

Further, the assembling portion 9121 is provided to adapt to the shape of the inner wall 921 of the lens barrel 920 for assembling. The imaging portion 911 is designed as a free-form surface, and the connection between the assembling portion 9121 and the imaging portion 911 can be achieved through the transition portion 9122. The transition portion 9122 complements the surface shape of the imaging portion 911, so that the assembling portion 9121, the transition portion 9122 and the imaging portion 911 are connected to form the optical lens element 910, which is suitable for being assembled to the lens barrel 920. The assembly of the assembling portion 9121 does not affect the light passing through the imaging portion 911 to participate in imaging.

For example, the assembling portion 9121 can be implemented as a circular ring with a regular shape, and is suitable for being adapted to the shape of the inner wall 921 of the lens barrel 920. The assembling portion 9121 may also be implemented as a circular ring with protrusion(s) and groove(s), or may also be implemented as other shapes matching the shape of the inner wall 921 of the lens barrel 920. The design of the assembling portion 9121 can refer to the design of the existing non-free-form lens elements, so that the assembly of the optical lens element 910 can refer to the assembly method of the existing non-free-form lens elements, and it is adapted to the existing lens element assembly holes and assembled to the existing optical lenses.

The assembling portion 9121 may be rotationally symmetrical, or may be non-rotationally symmetrical. When the inner wall 921 of the lens barrel 920 is rotationally symmetrical, the shape of the assembling portion 9121 may be implemented as rotationally symmetrical.

By providing the transition portion 9122, the surface design of the imaging portion 911 is not limited. The connection with the assembling portion 9121 can be realized by configuring the transition portion 9122 with a different design for the imaging portion 911 with a different design. The shape of the assembling portion 9121 is adapted to the inner wall 921 of the lens barrel 920, and the shape of the outer periphery of the transition portion 9122 is adapted to the assembling portion 9121. The surface shape design of the imaging portion 911 is determined according to the optical requirements, the shape of the assembling portion 9121 is determined according to the assembling requirements, and the shapes of the inner periphery and the outer periphery of the transition portion 9122 are adapted to the shapes of the imaging portion 911 and the assembling portion 9121, respectively, so that the design of the imaging portion 911 and the assembling portion 9121 do not interfere with and limit each other.

In an example of the present disclosure, the optical lens 9100 can be implemented as a large wide-angle lens. The large wide-angle lens has a large field of view, but the large inclination of light causes large curvature of field and distortion. The optical lens element 910 with the free-form surface is assembled to the large wide-angle lens, to reduce the inclination of the light and reduce the distortion of the large field of view. Taking a lens with a field angle of 130° as an example, the optical lens element 910 with the free-form surface can be configured to reduce the distortion from 10% or more to 2% or less, so as to correct aberration. The resolution capability of the large wide-angle lens with the reduced distortion is improved, and the dependence on the distortion correction software is reduced or eliminated. Further, the settings can be reduced to avoid the problem of pixel loss in the software during distortion correction. That is to say, by equipping the optical lens 9100 with the optical lens element 910 having the free-form surface, the optical lens 9100 can reduce distortion through the design of its own optical system.

When processing the image photographed by the optical lens 9100 equipped with the optical lens element 910, the software needs to correct less distortion, the amount of data for correction calculation becomes less, and the loss of the image during processing is reduced.

The lens element configured in the existing camera module can be replaced, and the optical lens element 910 with the free-form surface can be assembled into the existing camera module, to reduce or eliminate aberration, reduce distortion, reduce the amount of data processing for software correction, and reduce image loss.

It is worth mentioning that, when assembling the lens elements of the existing camera module, it is necessary to ensure that the optical axes of the lens elements are coaxial. During the optical design of the optical lens element 910, it is ensured that its optical axis is unchanged, which is convenient for the optical axis of the optical lens element 910 to keep coaxial with other lens elements of the existing optical lens during assembly.

The present disclosure provides the optical lens 9100, including the optical lens element 910 and other lens elements. When assembling the optical lens element 910, the optical axis of the optical lens element 910 may be made coaxial with the optical axes of the other lens elements, to mount the optical lens element 910 and the other lens elements.

When assembling the optical lens element 910 with the free-form surface to the optical lens 9100, the optical lens element 910 with the free-form surface may be assembled between other lens elements, as shown in FIG. 20A, or may be assembled behind the other lens elements as the last lens element through which the light passes, as shown in FIG. 20B. The inclination angle of the light is adjusted so as to reduce the distortion of the optical lens 9100.

Since the optical lens element 910 is the last lens element to pass through, when the light passes through, it can correct the inclination angle generated when the light passes through other lens elements in front, so as to realize the light correction, and prevent a large inclination angle from being generated again when the light passes through other lens elements after passing through the optical lens element 910.

The surface shape and diopter design of the optical lens element 910 can be matched with other lens elements of the optical lens 9100, so that the optical lens 9100 has small distortion and a compact structure.

Figure 18A:
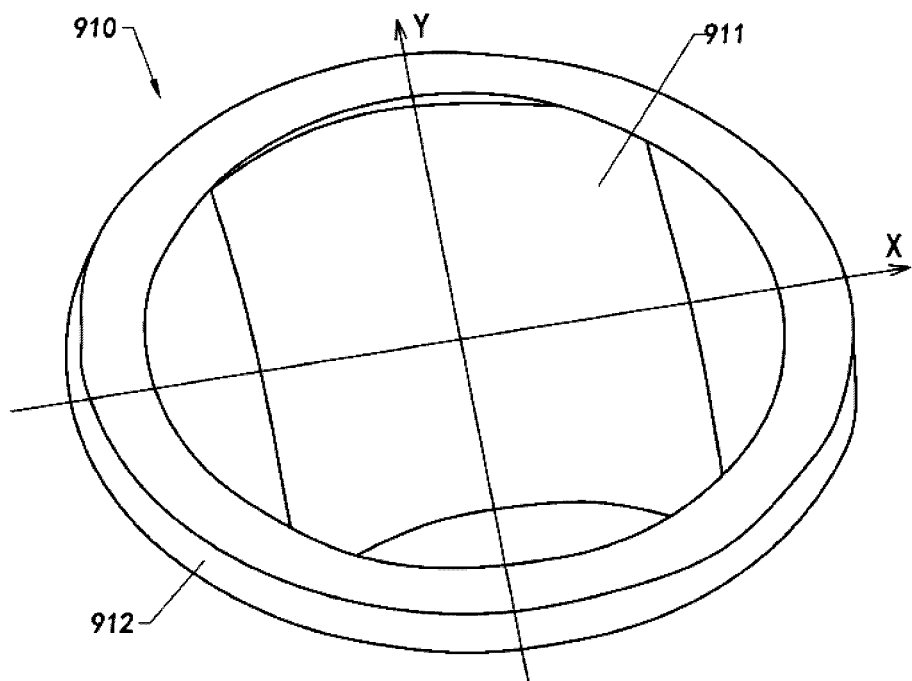
FIG. 18A is a schematic view of an optical lens element according to a preferred embodiment of the present disclosure.
Figure 18B:
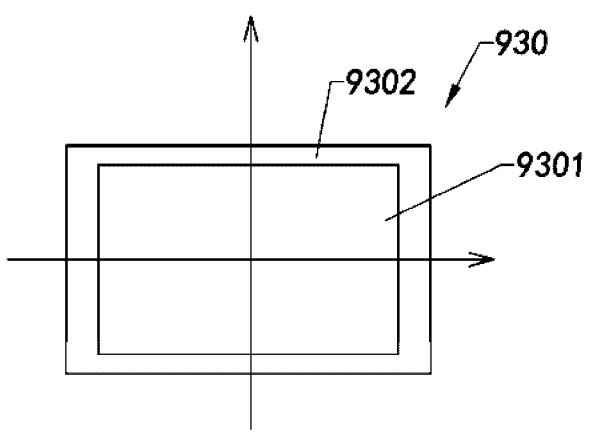
FIG. 18B is a schematic view of an imaging region of an optical lens according to a preferred embodiment of the present disclosure.

Referring to FIG. 18B, the camera module further includes a photosensitive element 930, the photosensitive element 930 is provided on an exit side of the optical lens element 910, the light passes through the optical lens element 910, and exits to the photosensitive element 930 where an image is formed.

A part of of the optical lens element 910 allowing the light to pass through and form an image on the photosensitive element 930 is the imaging portion 911 of the optical lens element 910. That is to say, the part of the optical lens element 910 through which the light can pass to form the image on the photosensitive element 930 is an effective region for imaging, i.e., the imaging portion 911.

Only the part of the optical lens element 910 through which the light can pass to form the image on the photosensitive element 930 is designed with a free-form surface, so as to correct aberration and reduce distortion. The shape of the imaging portion 911 is adapted to the shape of the photosensitive element 930.

That is to say, when designing the optical lens element 910, the part through which the light passes to participate in imaging is designed with a free-form surface to form the imaging portion 911, which corrects aberration and reduces distortion. The assembling portion 9121 in the shape of a rotating body is formed on the outer periphery of the optical lens element 910, and is suitable for assembling the optical lens element 910 to the optical lens 920. The transition portion 9122 is formed between the imaging portion 911 and the assembling portion 9121, to transition from the imaging portion 911 to the assembling portion 9121. The design of the optical lens element 910 can achieve the effects of aberration correction and distortion reduction for imaging, and it can also be assembled to the lens barrel 920 and other existing optical lenses to reduce assembly difficulty and improve the applicability of the optical lens element 910.

In addition, only the part of the optical lens element 910 through which the light passes to participate in imaging is designed with a free-form surface, so as to reduce the occupied region of the free-form surface in the optical lens element 910 and reduce the difficulty of designing and processing a free-form surface.

The photosensitive element 930 has a photosensitive region 9301, and light forms an image in the imaging region 301.

The surface of the imaging portion 911 is configured as a free-form surface. The light passes through the imaging portion 911 with the free-form surface. An effective imaging region 9302 is formed on the photosensitive element 930. The effective imaging region 9302 covers the entire photosensitive region 9301 so as to effectively utilize the photosensitive region 9301.

A coordinate axis is established for the optical lens element 910, and an XY plane where the optical lens element 910 is located is determined. The imaging portion 911 of the optical lens element 910 is symmetrical on the XY plane. The shape of the imaging portion 911 on the XY plane may be a rectangle, an ellipse, or other shapes that are symmetrical with respect to the XY plane. Preferably, the shape of the imaging portion 911 on the XY plane is a rectangle that is adapted to the shape of the photosensitive element 930, so that the effective imaging region 9302 formed by the light passing through the imaging portion 911 on the photosensitive element 930 is rectangular. The effective imaging region 9302 can completely cover the photosensitive region 9301, so as to improve the utilization rate of the photosensitive region 9301.

Further, when the imaging portion 911 is designed with a free-form surface, the distortion adjustment parameters of the imaging portion 911 in the X-axis and the Y-axis are inconsistent. The imaging portion 911 is symmetrical only in the X-axis or Y-axis.

When light enters the lens barrel 920 and passes through the optical lens element 910, it can pass through the imaging portion 911 and the non-imaging portion 912. The light passing through the imaging portion 911 needs to participate in imaging, and the light passing through the non-imaging portion 912 may also be obtained by the photosensitive element 930, resulting in interfering with imaging.

When designing the optical lens element 910, the surface of the imaging portion 911 is designed as a free-form surface to correct the distortion. The non-imaging portion 912 is used for assembly. The surface height of the imaging portion 911 is inconsistent with the surface height of the non-imaging portion 912, and there is a fault in height. The height difference between the imaging portion 911 and the non-imaging portion 912 may cause phenomena such as stray light, which adversely affects imaging. The assembling portion 9121 of the non-imaging portion 912 is suitable for being assembled, and the transition portion 9122 complements the surface shape of the imaging portion 911, to connect the imaging portion 911 and the assembling portion 9121 to form the optical lens element 910.

The non-imaging portion 912 is designed to avoid adverse effects on imaging caused by the height difference between the imaging portion 911 and the non-imaging portion 912. Specifically, a light-blocking treatment is performed on a surface of one side of the non-imaging portion 912, in order to prevent light from passing through the non-imaging portion 912 to interfere with imaging. Referring to FIG. 4A, the light-blocking treatment is performed on the leaning surface 91211 of the assembling portion 9121 and the transition surface 91221 of the transition portion 9122, to prevent light from passing through the assembling portion 9121 and the transition portion 9122.

One side of the transition surface 91221 of the transition portion 9122 close to the imaging portion 911 and the first surface 9111 of the imaging portion 911 have a certain height difference, so as to form a fault plane 91222 on the surface of the extension portion from the top of the transition surface 91221 of the transition portion 9122 to the first surface 9111 of the imaging portion 911.

The fault plane 91222 has a certain height, and a certain fault is formed between the transition portion 9122 and the imaging portion 911, so that the connection between the non-imaging portion 912 and the imaging portion 911 has a certain height difference.

A light-blocking treatment is performed on the surface of the non-imaging portion 912. Specifically, referring to FIG. 21B, a light-blocking treatment is performed on the leaning surface 91211 of the assembling portion 9121, the transition surface 91221 of the transition portion 9122 and the fault plane 91222, to prevent light from passing through the leaning surface 91211, the transition surface 91221 and the fault plane 91222, and block light from passing through the non-imaging portion 912 to participate in imaging.

The fault plane 91222 will refract and reflect light, and a light-blocking treatment is performed on the fault plane 91222 to reduce the influence of light refraction and reflection caused by the height fault and to reduce the interference to imaging.

In another example of the present disclosure, a light blocking treatment is performed on the surfaces on both sides of the non-imaging portion 912 to prevent light from passing through the non-imaging portion 912.

Figure 22:
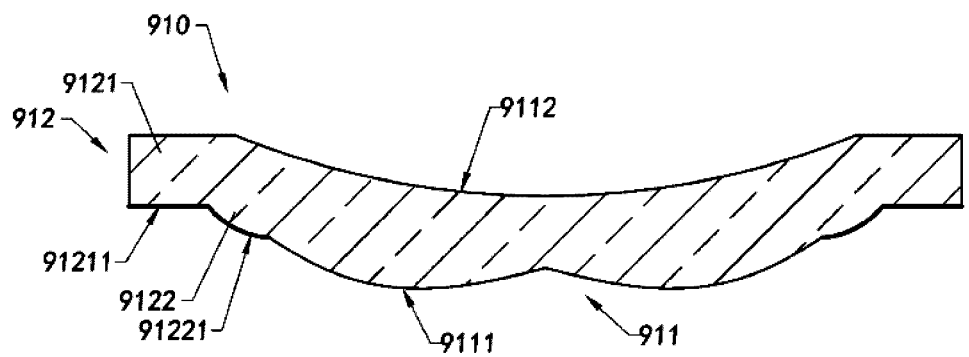
FIG. 22 is a schematic view of an optical lens element according to a preferred embodiment of the present disclosure.

Referring to FIG. 22, the surface shape of the transition portion 9122 is designed to eliminate the height difference between the transition portion 9122 and the imaging portion 911, the transition surface 91221 of the transition portion 9122 and the first surface 9111 of the imaging portion 911 are connected, and the surface of the optical lens element 910 naturally transitions from the non-imaging portion 912 to the imaging portion 911, to eliminate the undesirable influences such as stray light caused by the height difference between the non-imaging portion 912 and the imaging portion 911.

It is worth mentioning that the light blocking treatment performed on the non-imaging portion 912 is, for example, but not limited to, black-painted treatment, film coating, or the like.

The present disclosure further provides a manufacturing method for the optical lens element 910, and the manufacturing method includes the following steps:

(A) designing a surface of at least one side of the imaging portion 911 to be a free-form surface; and (B) providing the non-imaging portion 912 on an outer periphery of the imaging portion 911.

The shape of the imaging portion 911 on the XY plane is symmetrical, and the shape of the imaging portion 911 on the XY plane is only symmetrical with respect to the X axis, or is only symmetrical with respect to the Y axis.

The step (B) further comprises the following steps:
complementing the transition portion 9122 on the outer periphery of the imaging portion 911; and
providing the assembling portion 9121 on the outer periphery of the transition portion 9122.

The transition portion 9122 connects the assembling portion 9121 and the imaging portion 911. The shapes of the assembling portion 9121 and the imaging portion 911 are designed to not interfere with each other, and the transition portion 9122 is used as a transition and complement in shape.

The step (B) further comprises the following steps:
designing the shape of the assembling portion 9121 to be adapted to the inner wall 921 of the lens barrel 920.

The assembling portion 9121 is suitable for being assembled to the inner wall 921 of the lens 920, so that the optical lens element 910 is suitable for being assembled.

The step (B) further comprises the following steps:

designing the surface shape of the transition portion 9122 to eliminate the height difference between the transition portion 9122 and the imaging portion 911.

Since the imaging portion 911 is configured as a free-form surface, there is likely to be a height difference in the transition from the transition portion 9122 to the imaging portion 911. The surface shape of the transition portion 9122 is designed to eliminate the height difference and reduce the interference of the stray light caused by the height difference to the imaging.

The step (B) further includes the following step: performing a light-blocking treatment on a surface of at least one side of the non-imaging portion 912. The light-blocking treatment is performed on the surface of at least one side of the non-imaging portion 912, so as to prevent light from passing through the non-imaging portion 912 and interfering with imaging.

The step (B) further comprises the following step:

performing a light-blocking treatment on a fault plane caused by a height difference between the transition portion 9122 and the imaging portion 911. The light-blocking treatment is performed on the fault plane between the transition portion 9122 and the imaging portion 911, so as to reduce the interference caused by light refraction and reflection to imaging.

It should be understood by those skilled in the art that the embodiments of the present disclosure shown in the above description and the drawings are only used as examples and do not limit the present application. The objectives of the present disclosure have been fully and effectively achieved. The functional and structural principles of the present disclosure have been shown and described in the embodiments, and the implementations of the present disclosure may be changed or modified in any way without departing from the principles.

What is claimed is:

1. An optical lens, comprising a lens barrel, at least one first lens element unit and at least one second lens element unit, wherein the first lens element unit and the second lens element unit are disposed in the lens barrel, and the first lens element unit is a non- rotationally symmetrical lens element, wherein the optical lens is further provided with at least one notch, and wherein the notch is provided on the lens barrel, and the first lens element unit is marked by means of the notch, wherein the first lens element unit is directionally mounted in the lens barrel according to a position of the notch, so that a position and a shape of an imaging plane of the optical lens are determined by visually identifying the position of the notch.

2. The optical lens according to claim 1, wherein the first lens element unit comprises an effective diameter portion and a structural portion, and wherein the structural portion extends outward from the effective diameter portion, and the notch is located at a fixed preset angle relative to the effective diameter portion of the first lens element unit, so as to determine the position and angle of the effective diameter portion according to the position of the notch;

wherein the lens barrel comprises a lens barrel main body and is further provided with a lens element mounting cavity, wherein the first lens element unit and the second lens element unit are fixed in the lens element mounting cavity by the lens barrel main body, and wherein the first lens element unit is directionally mounted in the lens element mounting cavity based on the position of the notch.

3. The optical lens according to claim 2, wherein the lens barrel main body of the lens barrel has a lens barrel inner wall and a lens barrel outer wall, and wherein the notch is formed in the lens barrel inner wall in a cut-edge manner.

4. The optical lens according to claim 2, wherein the lens barrel main body of the lens barrel has a lens barrel inner wall and a lens barrel outer wall, and wherein the notch penetrates the lens barrel inner wall and the lens barrel outer wall in a cut-edge manner.

5. The optical lens according to claim 2, wherein the first lens element unit further comprises an identification portion, wherein the identification portion extends radially outward from the structural portion, and wherein the identification portion correspondingly marks the effective diameter portion, and the notch is adapted to the identification portion, so that the first lens element unit is engaged with the notch.

6. An optical lens, comprising a lens barrel and an optical system, wherein the optical system is disposed in the lens barrel, the optical system further comprises at least one first lens element unit and at least one second lens element unit, wherein the first lens element unit and the second lens element unit are disposed in the lens barrel, wherein the first lens element unit is a non-rotationally symmetrical lens element, wherein the optical lens is further provided with at least one notch, and wherein the notch is provided on the optical system, and the first lens element unit is marked by means of the notch, wherein the first lens element unit is directionally mounted in the lens barrel according to a position of the notch, so that a position and a shape of an imaging plane of the optical lens are determined by visually identifying the position of the notch;

wherein the first lens element unit comprises an effective diameter portion and a structural portion, and wherein the structural portion extends outward from the effective diameter portion, and the notch is located at a fixed preset angle relative to the effective diameter portion of the first lens element unit, so as to determine the position and angle of the effective diameter portion according to the position of the notch.

7. The optical lens according to claim 6, wherein the notch is formed in the at least one first lens element unit of the optical system, and wherein the notch corresponds to the effective diameter portion of the first lens element unit, so as to identify the position and shape of the effective diameter portion according to the identified notch;

wherein the lens barrel comprises a lens barrel main body and at least one identification unit, and wherein the identification unit is adapted to the notch, and when the first lens element unit is mounted on the lens barrel main body, the identification unit is inserted into the notch.

8. The optical lens according to claim 6, wherein the notch is formed in the at least one second lens element unit of the optical system, and wherein the notch corresponds to the effective diameter portion of the first lens element unit, so as to identify the position and shape of the effective diameter portion according to the identified notch;

wherein the lens barrel comprises a lens barrel main body and at least one identification unit, and wherein the identification unit is adapted to the notch, and when the first lens element unit is mounted on the lens barrel main body, the identification unit is inserted into the notch.

9. A camera module, comprising:
a photosensitive assembly; and
an optical lens, comprising a lens barrel, at least one first lens element unit and at least one second lens element unit, wherein the first lens element unit and the second lens element unit are disposed in the lens barrel, and the first lens element unit is configured as a non-rotating body, wherein the optical lens is further provided with at least one notch, and wherein the notch is provided on the lens barrel, and the first lens element unit is marked by means of the notch;
wherein the first lens element unit comprises an effective diameter portion and a structural portion, and wherein the structural portion extends outward from the effective diameter portion, and the notch is located at a fixed preset angle relative to the effective diameter portion of the first lens element unit, so as to determine the position and angle of the effective diameter portion according to a position of the notch;
wherein the first lens element unit and the second lens element unit form an imaging plane on an upper surface of a photosensitive element of the photosensitive assembly, and mounting positions of the optical lens and the photosensitive assembly are adjusted based on a position and angle of the imaging plane.

10. The camera module according to claim 9, wherein the photosensitive assembly comprises a circuit board and a-the photosensitive element, wherein the photosensitive element is conductively disposed on the circuit board, and wherein the optical lens is disposed on a photosensitive path of the photosensitive element.

11. The camera module according to claim 9, further comprising an optical lens fixing device, wherein the lens barrel of the optical lens is directionally fixed to the optical lens fixing device based on the position of the identification element, and a relative position of the imaging plane to a photosensitive imaging region of the photosensitive element is identified by the position of the identification element visually identified, to further adjust the optical lens fixing device, so that the imaging plane is adapted to the photosensitive imaging region of the photosensitive element.

12. The camera module according to claim 9, further comprising a motor and a motor housing, wherein the lens barrel is directionally locked to the motor housing by the motor at a fixed height based on the position of the identification element, and a relative position of the imaging plane to a photosensitive imaging region of the photosensitive element is identified by the position of the identification element visually identified, to further adjust the motor housing, so that the imaging plane is adapted to the photosensitive imaging region of the photosensitive element.

13. An optical lens element, which is suitable for being assembled to a lens barrel, wherein the optical lens element comprises:
an imaging portion from which light is emitted to participate in imaging, wherein a surface of at least one side of the imaging portion is configured as a free-form surface; and
a non-imaging portion formed on an outer periphery of the imaging portion;
wherein the non-imaging portion comprises an assembling portion and a transition portion, the transition portion is formed on the outer periphery of the imaging portion, the assembling portion is formed on an outer periphery of the transition portion, and the transition portion connects the imaging portion and the assembling portion;
wherein a light-blocking treatment on a fault plane caused by a height difference between the transition portion and the imaging portion.

14. The optical lens element according to claim 13, wherein a shape of the assembling portion is adapted to a shape of an inner wall of the lens barrel to which it is assembled, so that the optical lens element is assembled to the lens barrel;
wherein the transition portion complements a shape of the imaging portion to be adapted to the assembling portion.

15. The optical lens element according to claim 13, wherein a surface of at least one side of the non-imaging portion is subjected to the light-blocking treatment to block light from passing through.

16. An optical lens, comprising:
a lens barrel having an assembling space and an inner wall defining the assembling space; and
at least one optical lens element according to claim 13, wherein a shape of an outer periphery of the non-imaging portion is adapted to a shape of the inner wall of the lens barrel.

17. A camera module, comprising:
an optical lens according to claim 16; and
a photosensitive element disposed on an exit side of the optical lens element, wherein a light beam emitted from the imaging portion forms an effective imaging region on the photosensitive element.

18. The camera module according to claim 17, wherein the photosensitive element has a photosensitive region, and the effective imaging region completely covers the photosensitive region.

19. The camera module according to claim 18, wherein a shape of the effective imaging region is adapted to a shape of the photosensitive region.

* * * * *